United States Patent
Kuroda

(10) Patent No.: US 7,701,831 B2
(45) Date of Patent: Apr. 20, 2010

(54) INFORMATION RECORDING MEDIUM, INFORMATION RECORDING APPARATUS AND METHOD, AND COMPUTER PROGRAM

(75) Inventor: Kazuo Kuroda, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 688 days.

(21) Appl. No.: 10/588,303

(22) PCT Filed: Jan. 28, 2005

(86) PCT No.: PCT/JP2005/001241

§ 371 (c)(1),
(2), (4) Date: Aug. 3, 2006

(87) PCT Pub. No.: WO2005/076274

PCT Pub. Date: Aug. 18, 2005

(65) Prior Publication Data

US 2007/0128545 A1 Jun. 7, 2007

(30) Foreign Application Priority Data

Feb. 4, 2004 (JP) ............................. 2004-028247

(51) Int. Cl.
*G11B 7/007* (2006.01)
*G11B 20/12* (2006.01)
(52) U.S. Cl. ..................... 369/94; 369/275.3; 369/59.25
(58) Field of Classification Search ........................ None
See application file for complete search history.

(56) References Cited

U.S. PATENT DOCUMENTS

| | | | | |
|---|---|---|---|---|
| 5,729,525 A | * | 3/1998 | Ishida et al. | ............. 369/275.3 |
| 5,930,225 A | * | 7/1999 | Ishida et al. | ............. 369/275.1 |
| 6,370,091 B1 | * | 4/2002 | Kuroda | ..................... 369/30.08 |
| 6,643,231 B2 | * | 11/2003 | Ono et al. | ................ 369/44.28 |
| 2003/0081535 A1 | * | 5/2003 | Ross | ........................ 369/275.3 |
| 2004/0202083 A1 | * | 10/2004 | Ogawa et al. | ............ 369/59.25 |

FOREIGN PATENT DOCUMENTS

| | | |
|---|---|---|
| JP | 07-169197 A | 7/1995 |
| JP | 10-124879 A | 5/1998 |
| JP | 11-297005 A | 10/1999 |
| JP | 2002-150607 A | 5/2002 |
| JP | 2002-216361 A | 8/2002 |
| JP | 2002-260368 A | 9/2002 |
| JP | 2002-373423 A | 12/2002 |
| JP | 2003-132630 A | 5/2003 |
| JP | 2003-223759 A | 8/2003 |
| JP | 2003-263842 A | 9/2003 |
| JP | 2003-288759 A | 10/2003 |
| JP | 2005-093031 A | 4/2005 |
| WO | 02/086873 A1 | 10/2002 |
| WO | 03/038823 A1 | 5/2003 |

* cited by examiner

*Primary Examiner*—Christopher R Lamb
(74) *Attorney, Agent, or Firm*—Young & Thompson

(57) ABSTRACT

An information recording medium (100) is provided with: a first recording layer (L0 layer) and a second recording layer (L1 layer) in each of which record information can be recorded, the information recording medium includes a plurality of block areas, each of which is a unit of recording the record information and each of which includes a partial recording area of the first recording layer (105*a*) and a partial recording area of the second recording layer (115*a*) located in a position facing the partial recording area of the first recording layer.

14 Claims, 18 Drawing Sheets

[FIG. 1]
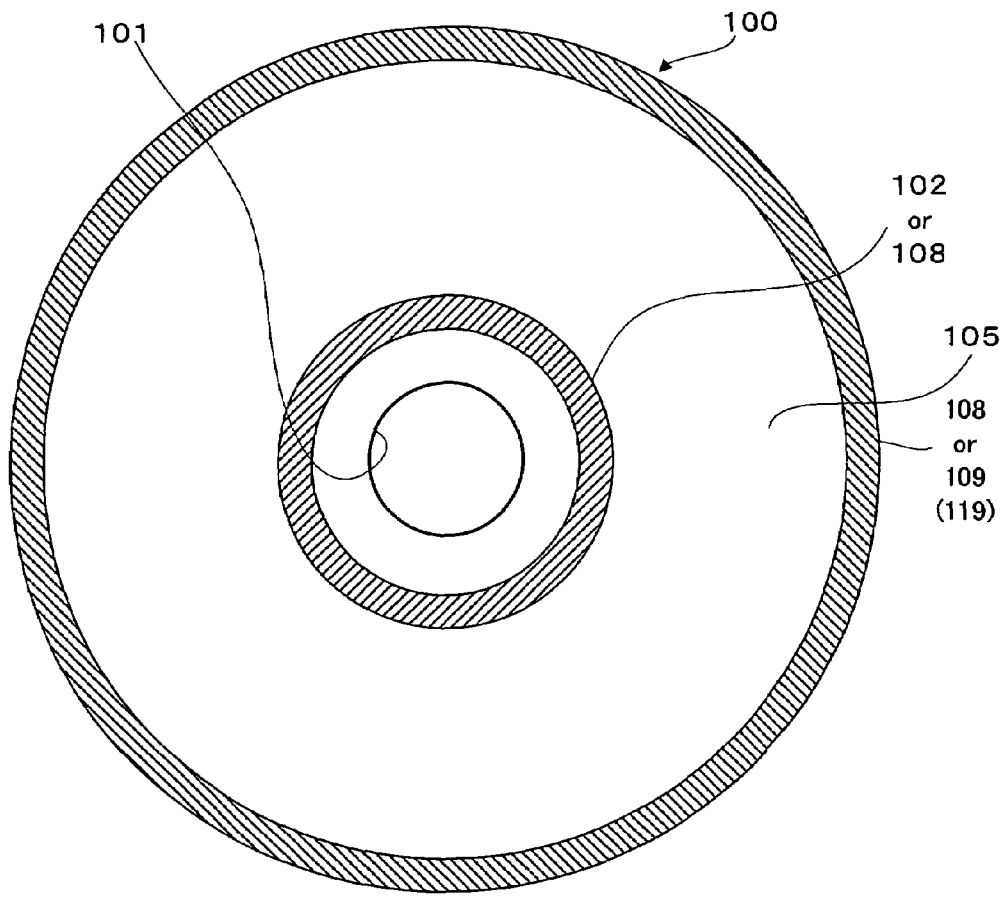
(a)
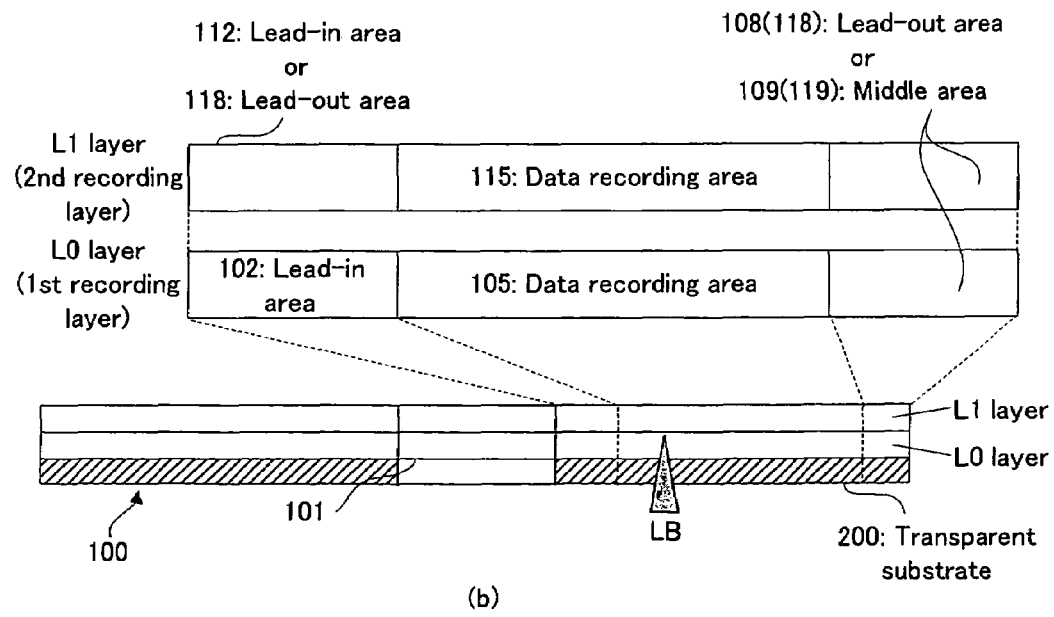
(b)

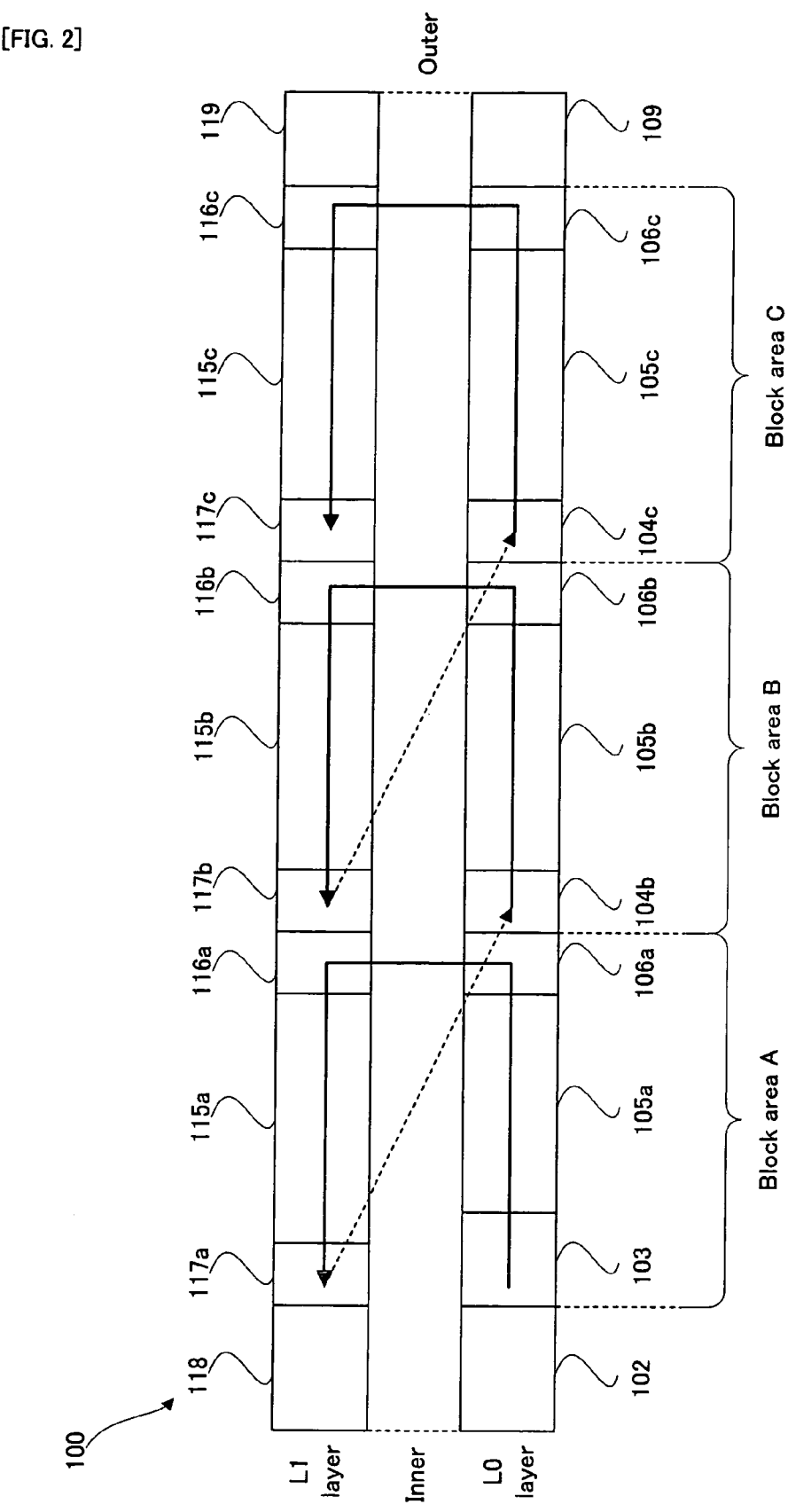
[FIG. 2]

[FIG. 3]
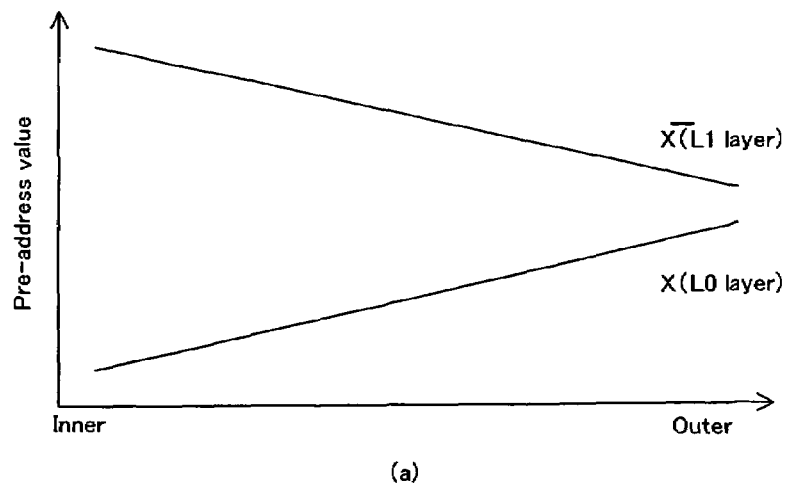
(a)
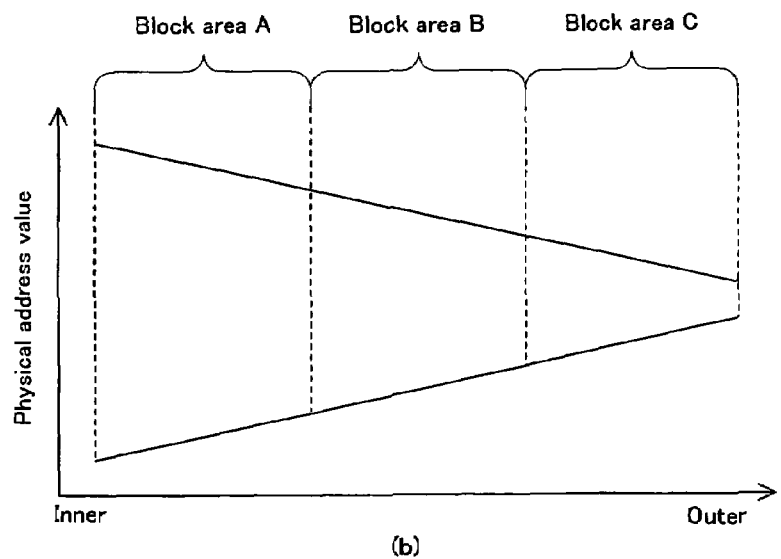
(b)
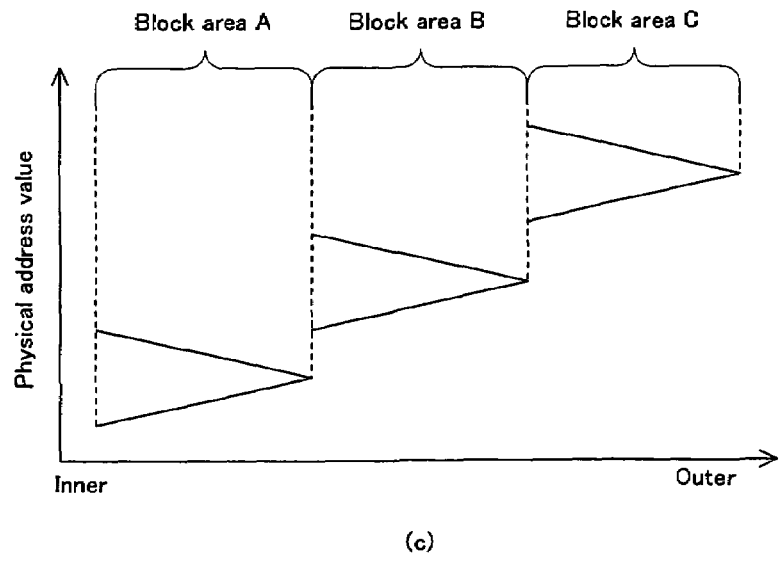
(c)

[FIG. 4]
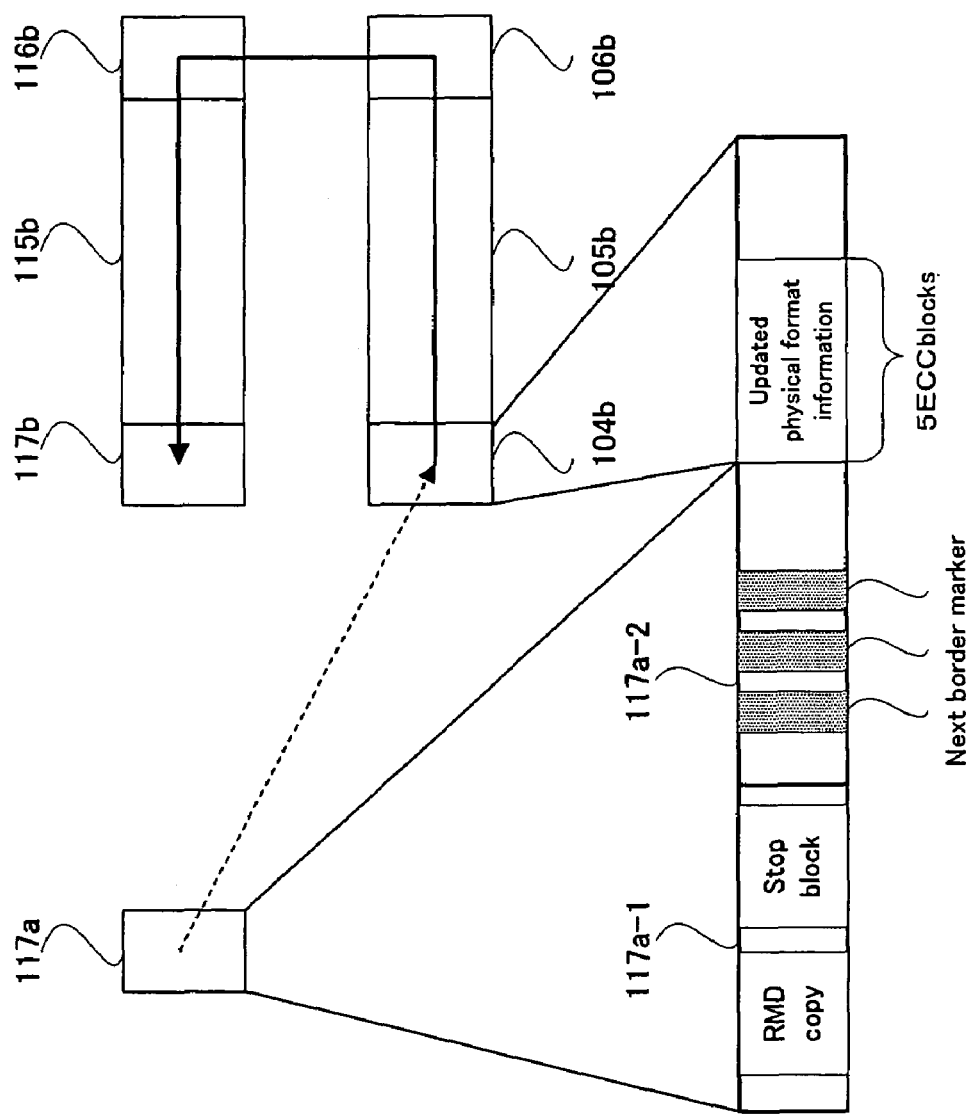

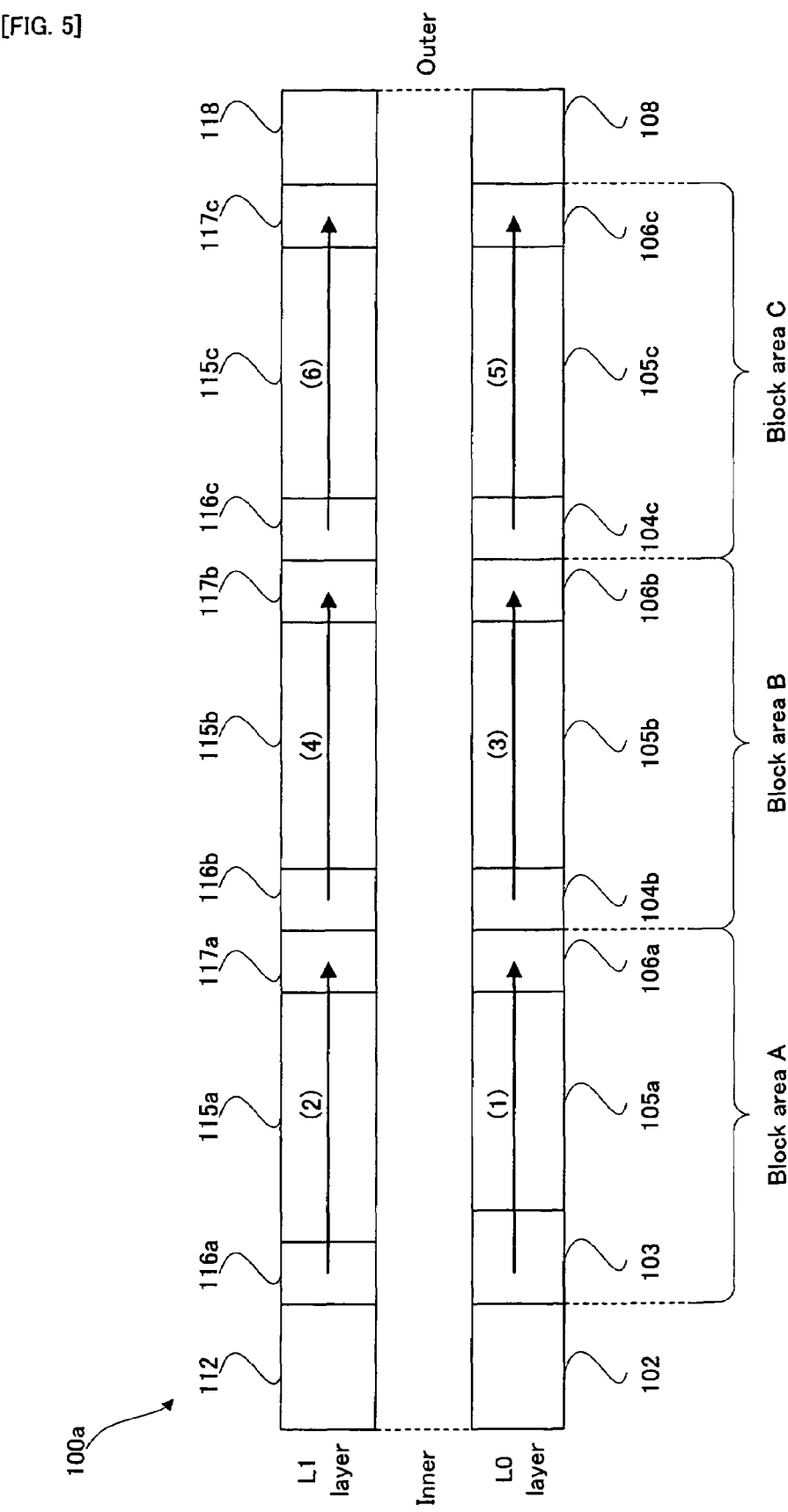
[FIG. 5]

[FIG. 6]
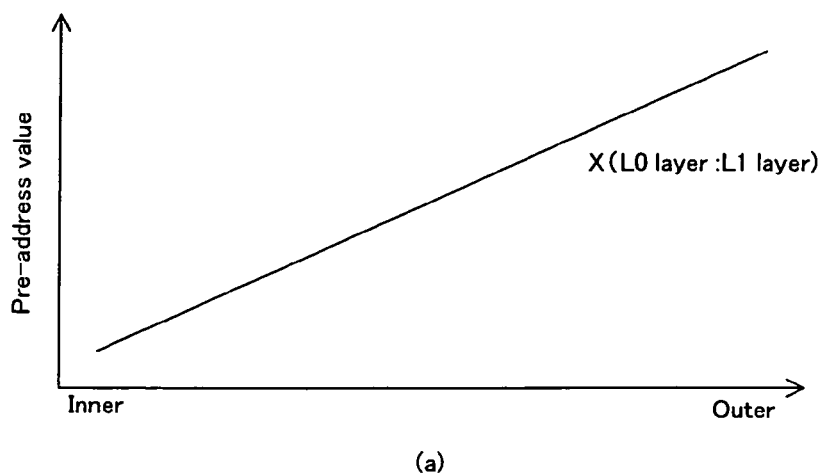
(a)
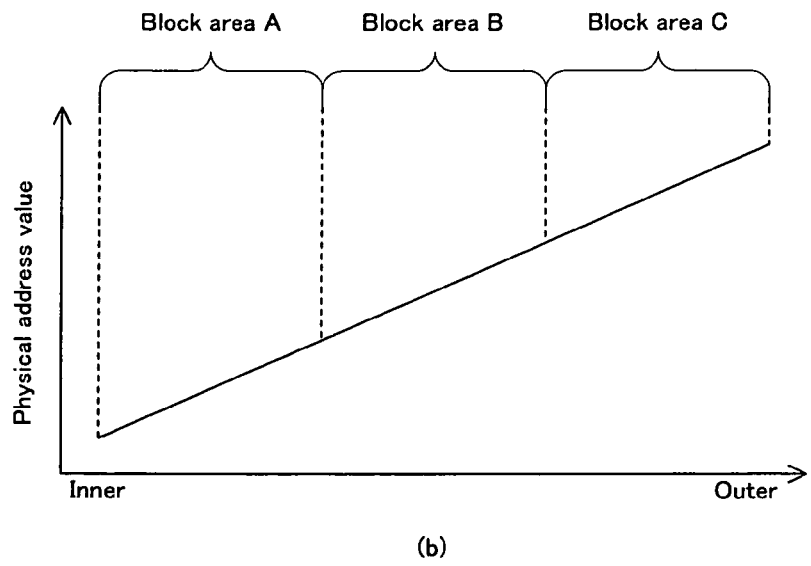
(b)
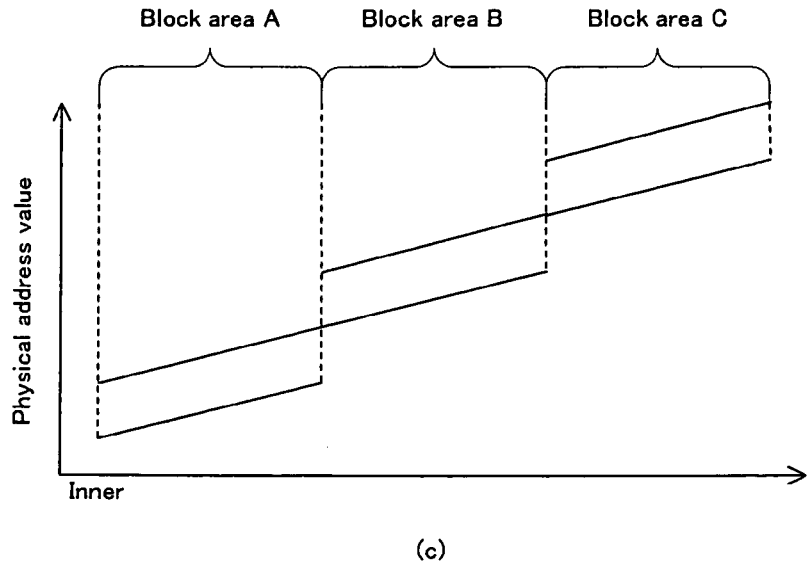
(c)

[FIG. 7]
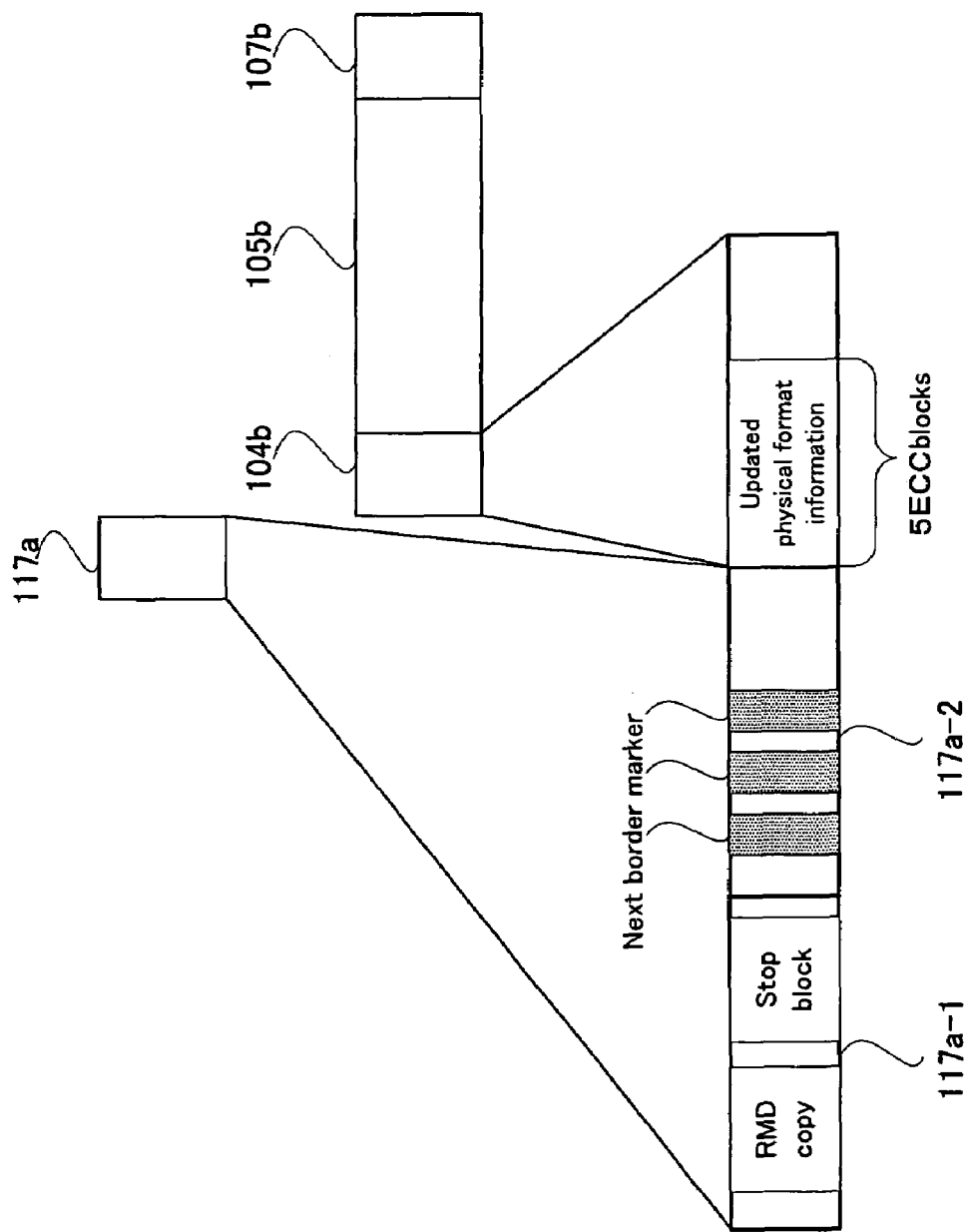

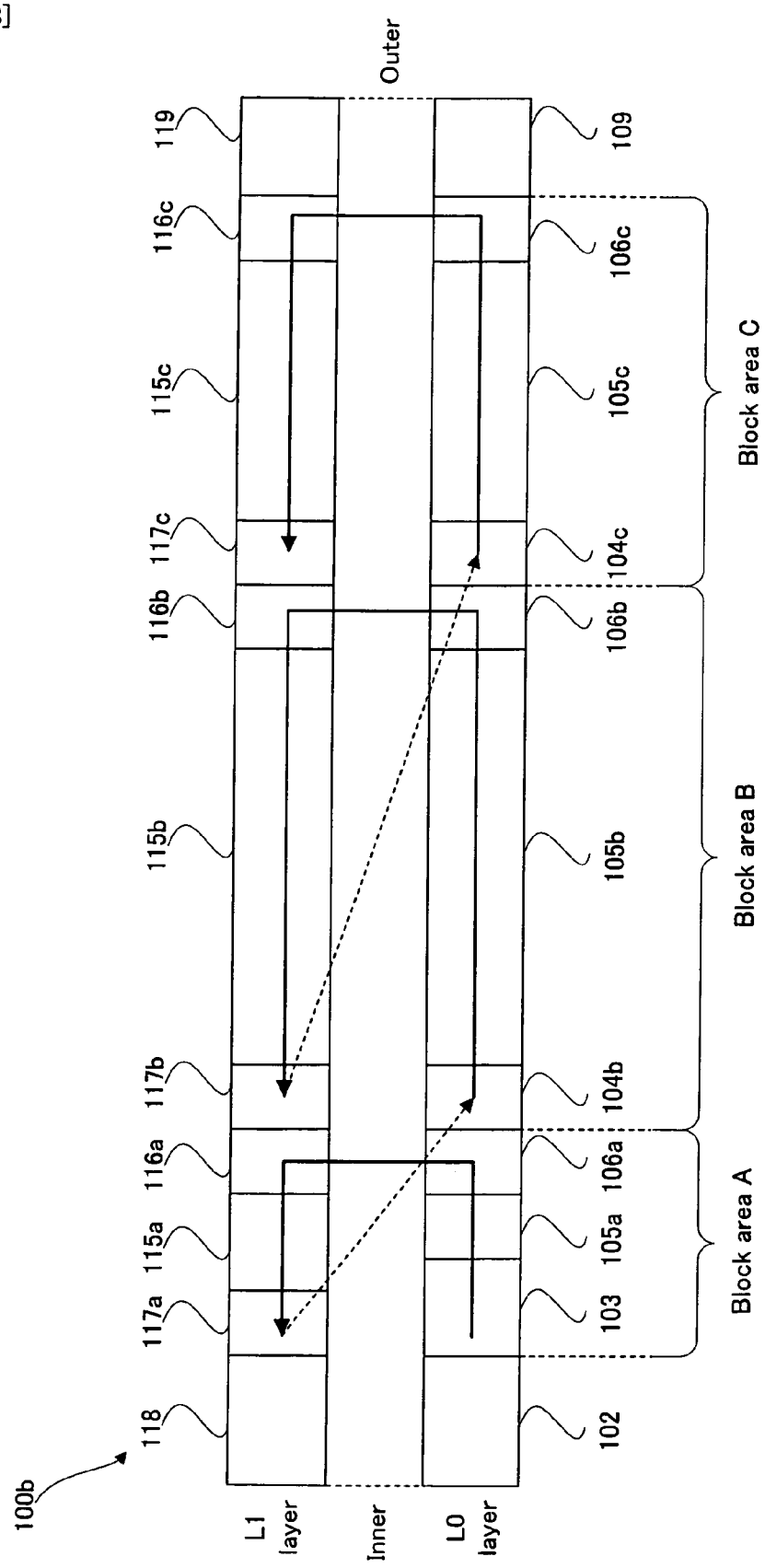
[FIG. 8]

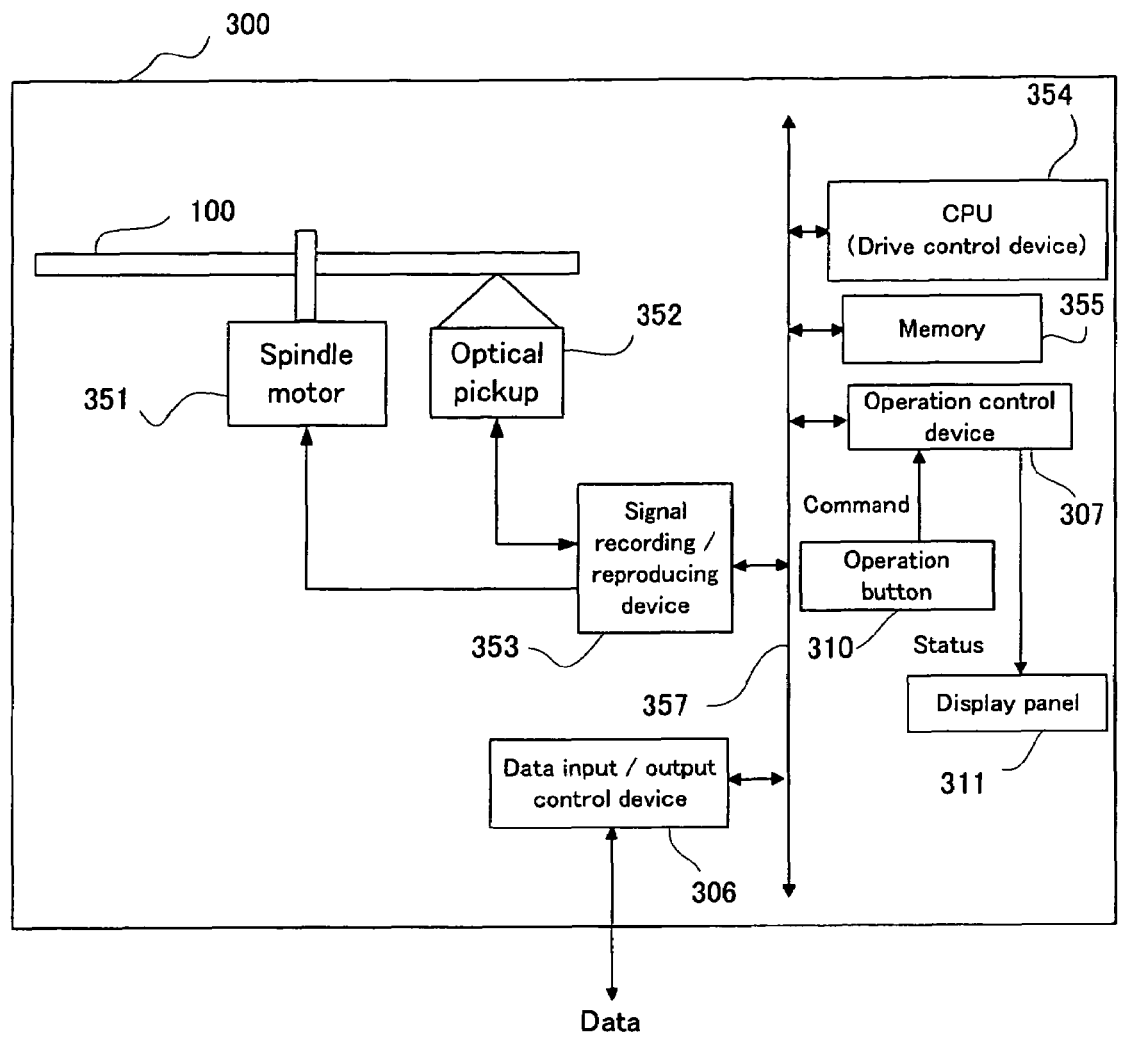
[FIG. 9]

[FIG. 10]
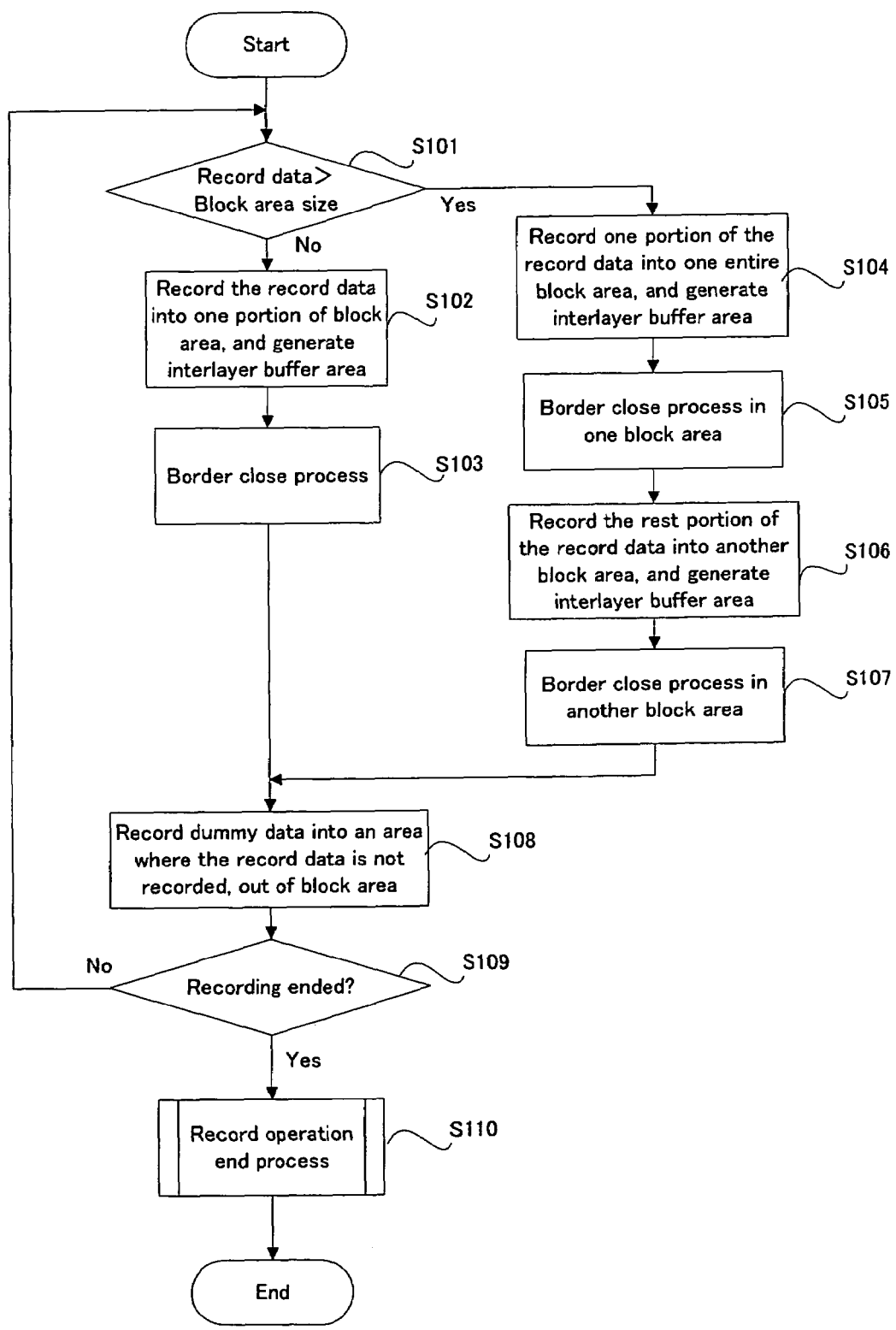

[FIG. 11]
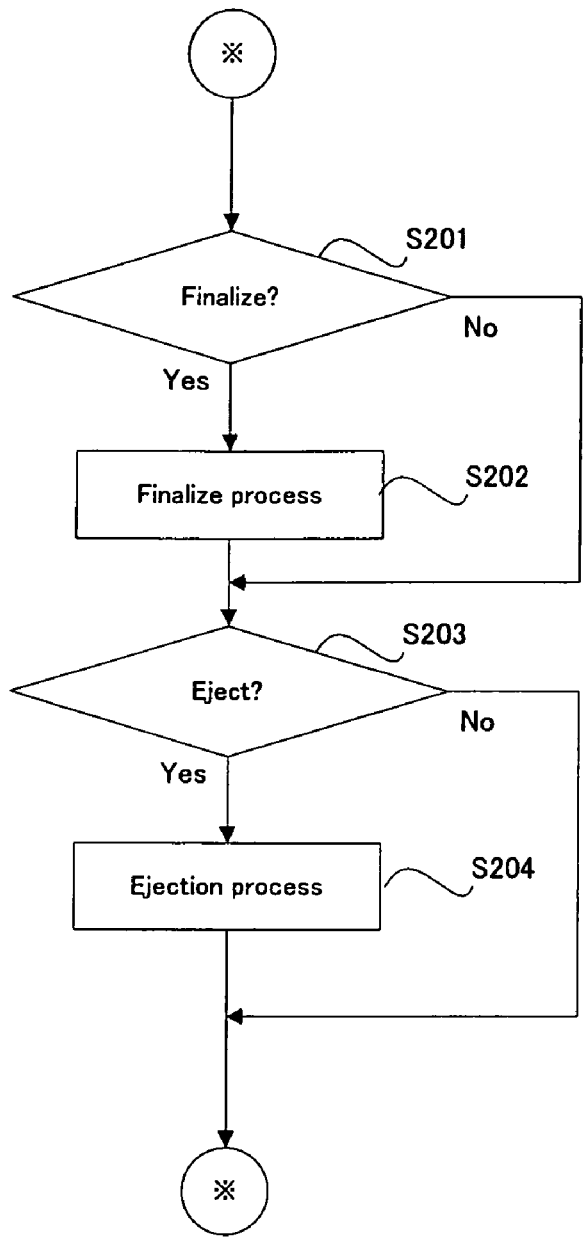

[FIG. 12]
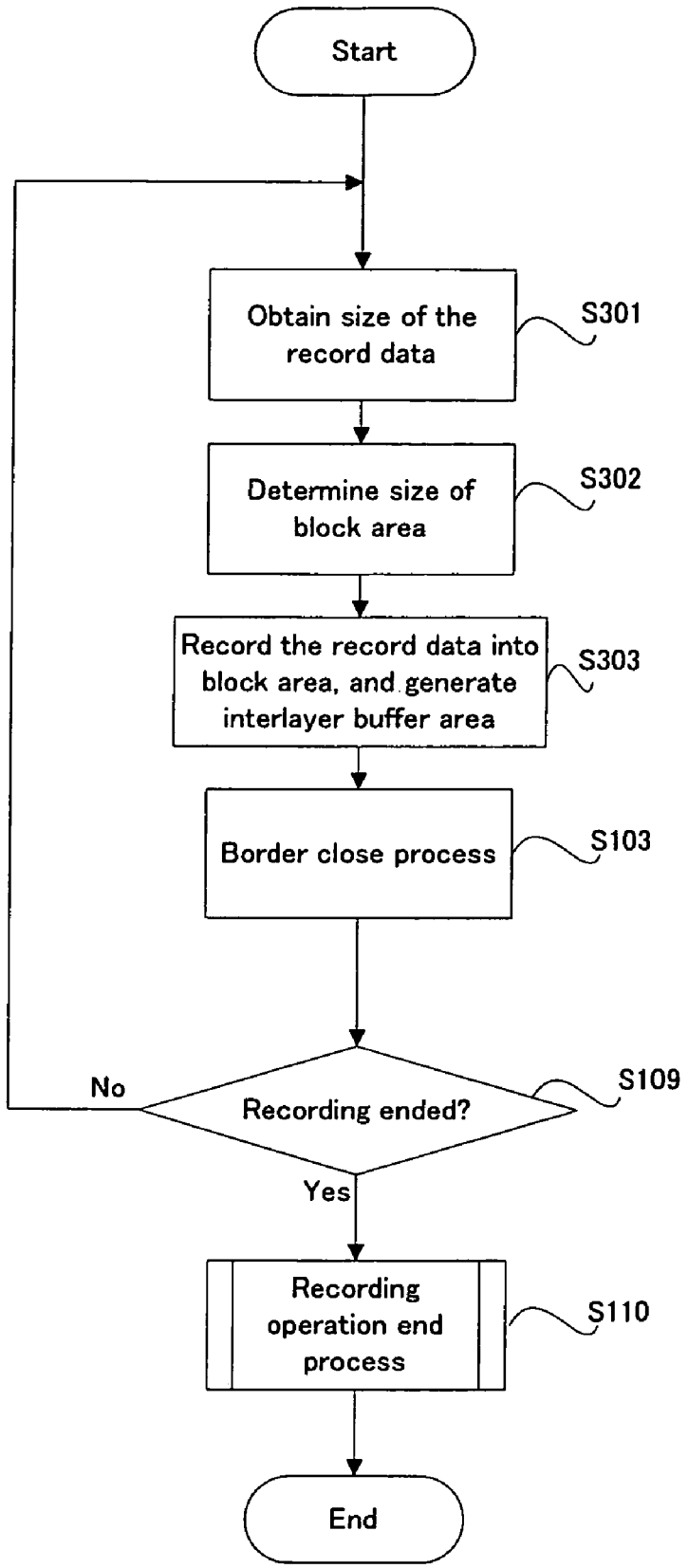

[FIG. 13]
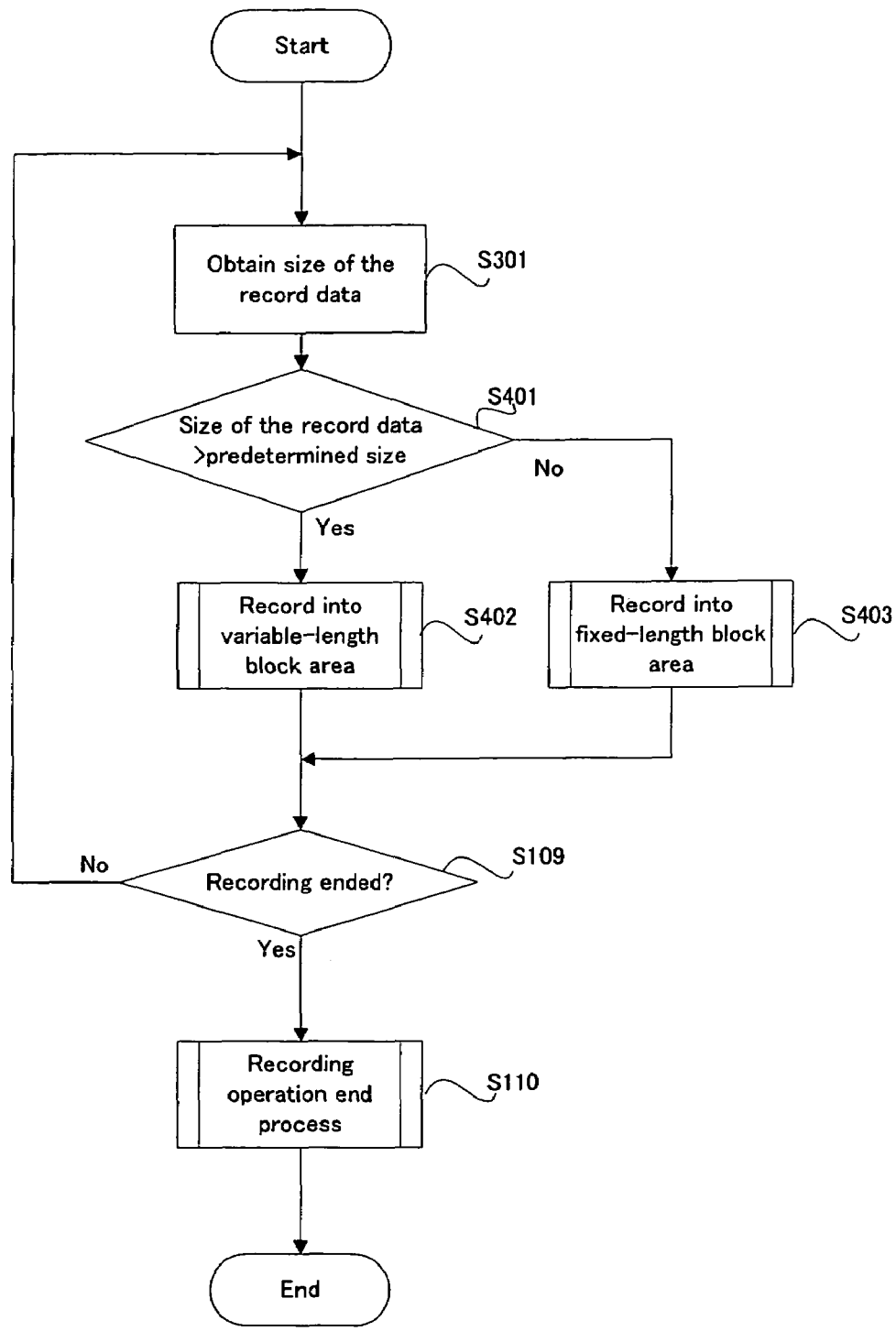

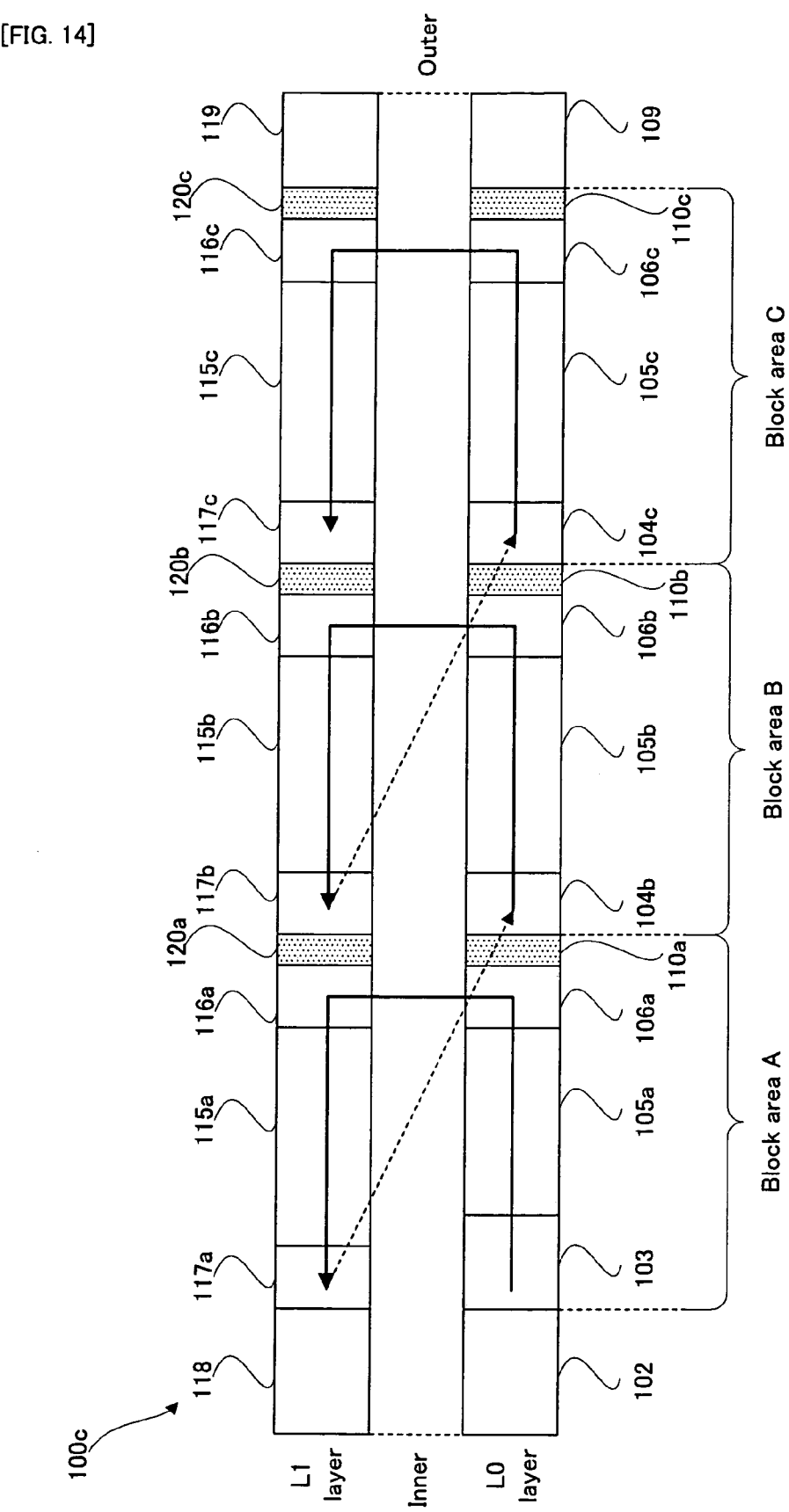
[FIG. 14]

[FIG. 15]
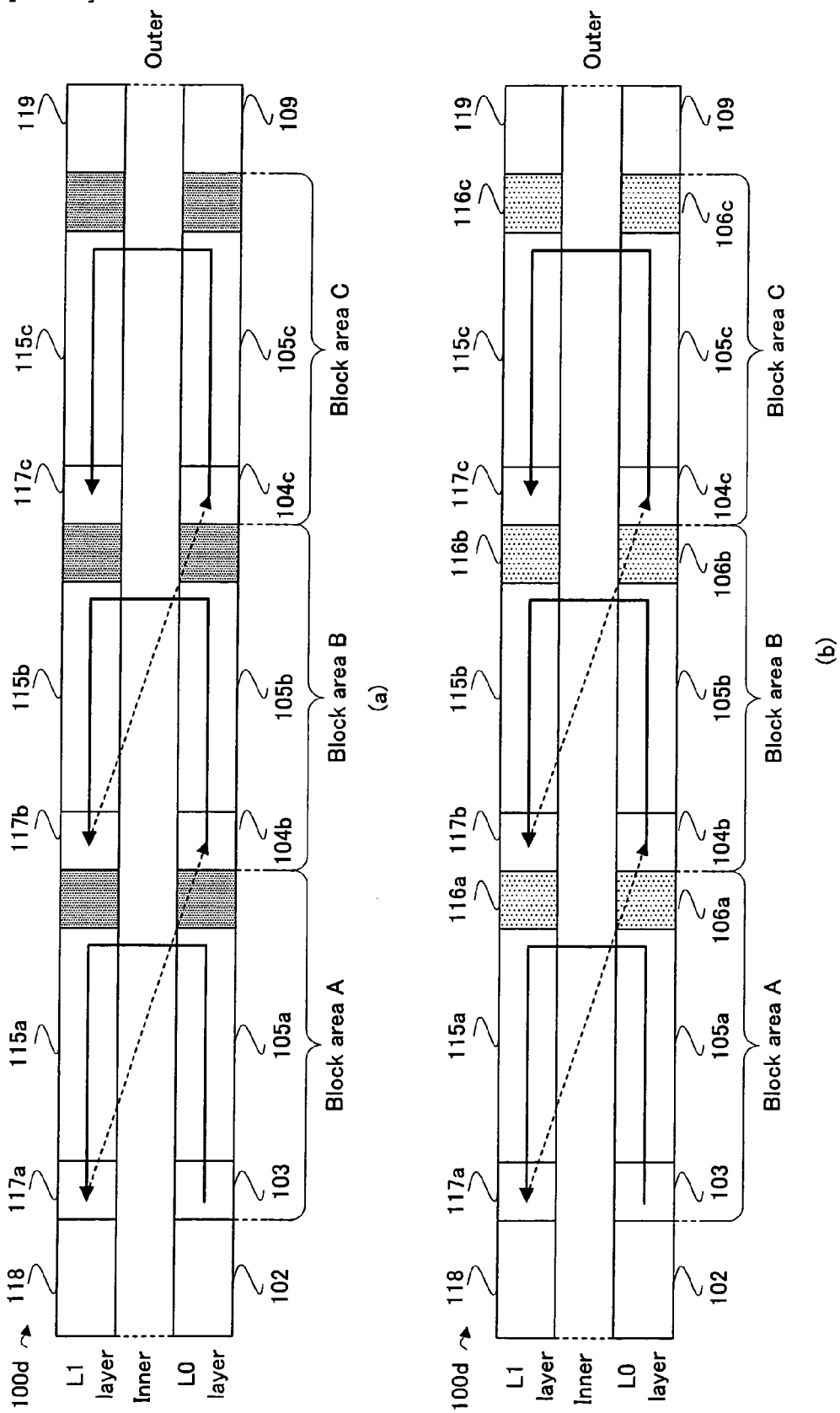

[FIG. 16]
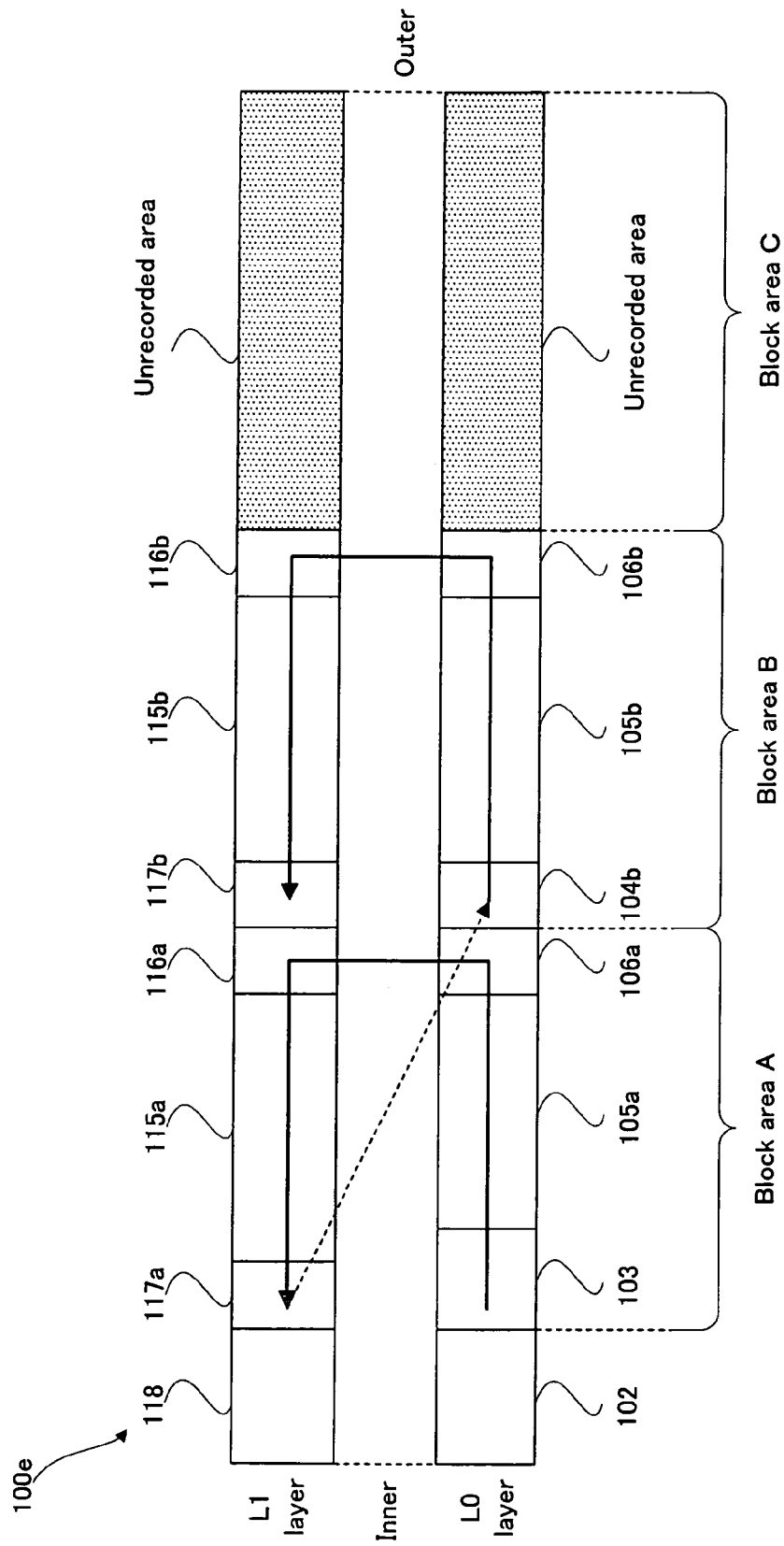

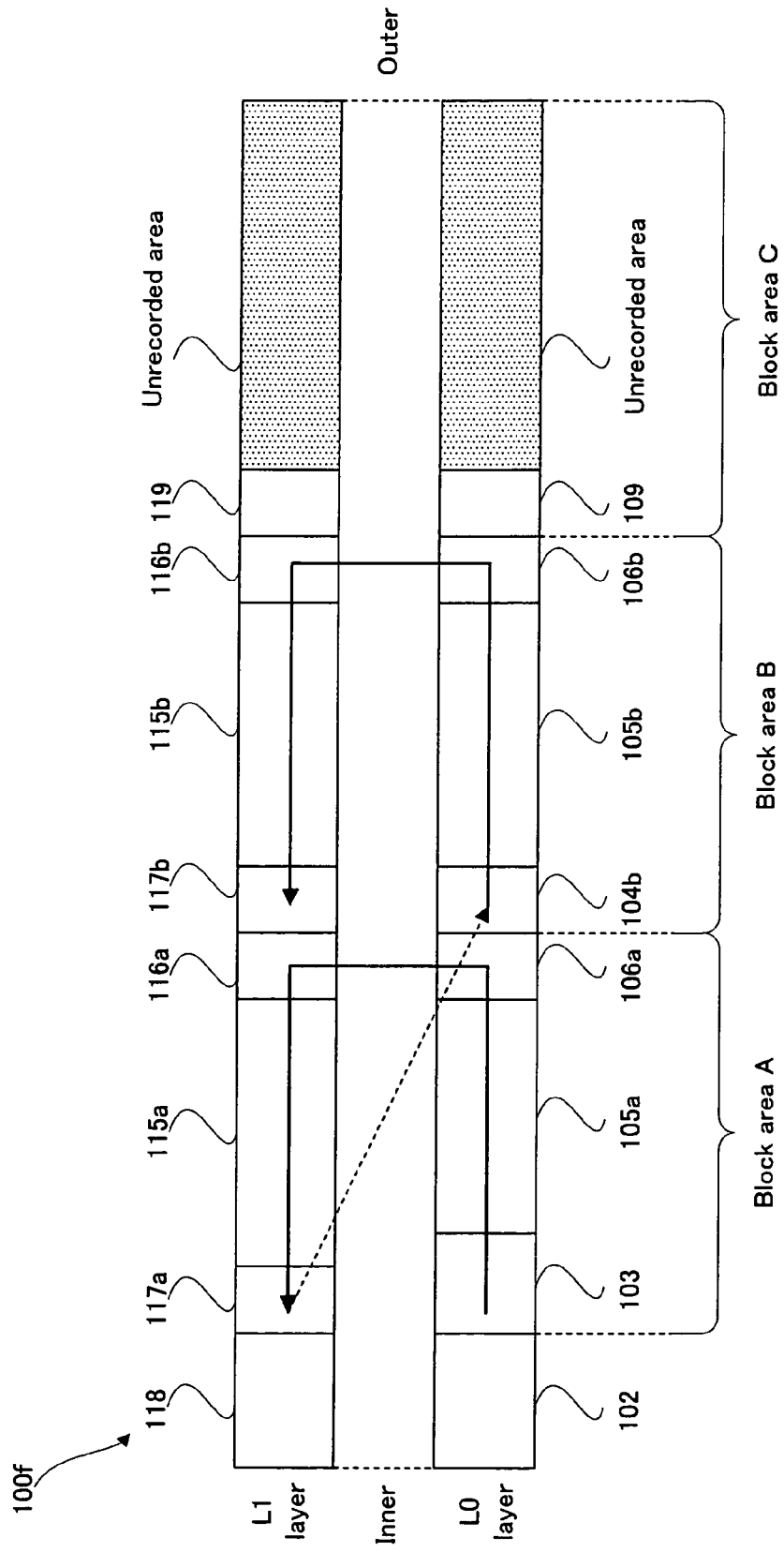
[FIG. 17]

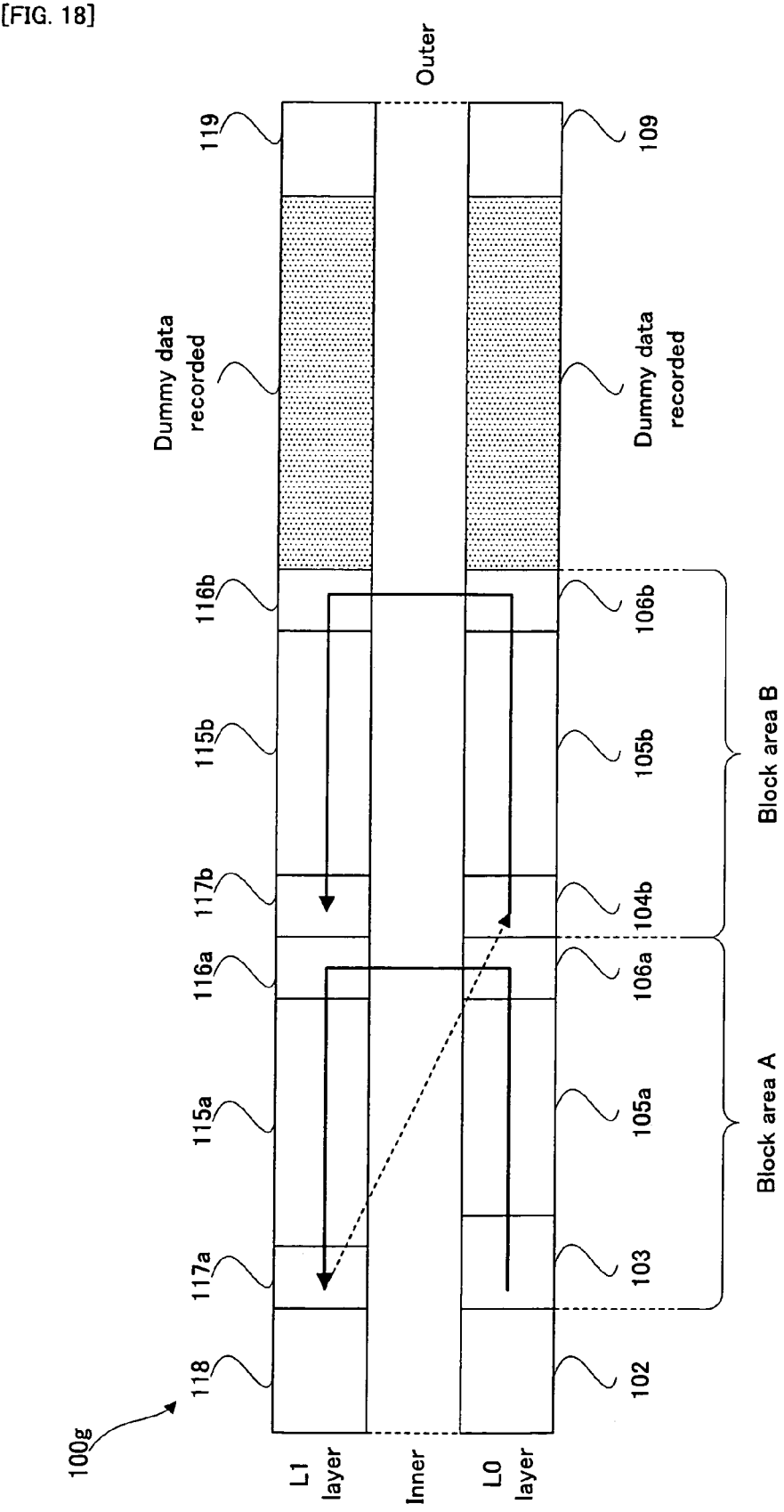
[FIG. 18]

INFORMATION RECORDING MEDIUM, INFORMATION RECORDING APPARATUS AND METHOD, AND COMPUTER PROGRAM

TECHNICAL FIELD

The present invention relates to an information recording medium, such as a DVD, an information recording apparatus, such as a DVD player, an information recording method, and a computer program.

BACKGROUND ART

In an information recording medium, such as an optical disc, like a CD-ROM (Compact Disc-Read Only Memory), a CD-R (Compact Disc-Recordable), and a DVD-ROM etc., for example, there has been also developed an optical disc of a multilayer type, dual layer type or multiple layer type in which a plurality of recording layers are laminated or stacked on the same substrate. More specifically, a dual-layer type optical disc has a first recording layer (referred to as a "L0 layer" in this application, as occasion demands) as a first layer, which is located on the nearest side (i.e. on the closest side to an optical pickup), viewed from the irradiation side of laser light, in recording by an information recording apparatus. Moreover, it has a semi-transparent reflective film located on the rear side of the first recording layer (i.e. on the farther side from the optical pickup). The dual-layer type optical disc has a second recording layer (referred to as a "L1 layer" in this application, as occasion demands) as a second layer, which is located on the rear side of the semi-transparent reflective film via a middle layer, such as an adhesive layer. Moreover, it has a reflective film located on the rear side of the second recording layer. Then, in preparing such a multilayer type information recording medium, the L0 layer and the L1 layer are separately formed, and bonded to each other in the end, to thereby manufacture the dual-layer type optical disc at low cost.

Then, on the information recording apparatus, such as a CD recorder, for recording information onto the dual-layer type optical disc, the information is recorded into the L0 layer in an irreversible change recording method, performed by irreversible change recording heating by heating or the like, or in a rewritable method, by focusing (or irradiating) the laser light for recording on the L0 layer. Moreover, the information is recorded into the L1 layer in the irreversible change recording method performed by irreversible change recording heating by heating or the like, or in the rewritable method, by focusing the laser light on the L1 layer.

Patent document 1: Japanese Patent Application Laying Open NO. 2002-352469

DISCLOSURE OF INVENTION

Subject to be Solved by the Invention

In such a dual-layer type optical disc, generally, data is firstly recorded into the L0 layer, and after data is recorded in the entire L0 layer, data is recorded into the L1 layer continuously. This causes the situation that the data is recorded in the entire L0 layer whereas the data is recorded only in one portion of the L1 layer. In this situation, if a finalize process to enable an existing CD-ROM player or the like to reproduce the information on the optical disc is performed, for example, it is necessary to record dummy data or the like, for example, in the L1 layer where the data is not recorded. Thus, there is such a technical problem that it takes more time for the finalize process, as compared to the size of the data actually recorded.

In order to solve the above-mentioned conventional problem, it is therefore an object of the present invention to provide an information recording medium, an information recording apparatus, and an information recording method, which enable the finalize process to be performed, more quickly, on the information recording medium having a plurality of recording layers, for example, and a computer program which makes a computer function as such an information recording apparatus.

Means for Solving the Subject

The above object of the present invention can be achieved by an information recording medium provided with: a first recording layer and a second recording layer in each of which record information can be recorded, the information recording medium including a plurality of block areas, each of which is a unit of recording the record information and each of which includes a partial recording area of the first recording layer and a partial recording area of the second recording layer located in a position facing the partial recording area of the first recording layer.

The above object of the present invention can be also achieved by an information recording apparatus provided with: a recording device for recording record information onto an information recording medium provided with: a first recording layer and a second recording layer in each of which the record information can be recorded; and a first controlling device for controlling the recording device to record the record information by a unit of each of a plurality of block areas, each of which includes a partial recording area of the first recording layer and a partial recording area of the second recording layer located in a position facing the partial recording area of the first recording layer.

The above object of the present invention can be also achieved by an information recording method provided with: a recording process of recording record information onto an information recording medium provided with: a first recording layer and a second recording layer in each of which the record information can be recorded; and a first controlling process of controlling the recording process to record the record information by a unit of each of a plurality of block areas, each of which includes a partial recording area of the first recording layer and a partial recording area of the second recording layer located in a position facing the partial recording area of the first recording layer.

The above object of the present invention can be also achieved by a computer program for record control to control a computer provided for the information recording apparatus of the present invention, to make the computer function as at least one portion of the recording device and the first controlling device.

These effects and other advantages of the present invention will become more apparent from the following best mode for carrying out the invention.

BRIEF DESCRIPTION OF DRAWINGS

FIG. 1 are a substantial plan view showing the basic structure of an optical disc having a plurality of recording areas associated with an information recording medium which is a target of a first example of the information recording apparatus of the present invention, and a schematic cross sectional view of the optical disc and a corresponding conceptual diagram showing a recording area structure in the radial direction.

FIG. 2 is a data view conceptually showing an example of the data structure of one optical disc of the first example.

FIG. 3 are graphs conceptually showing a relationship between a position on a disc and a pre-address value in the one optical disc of the first example.

FIG. 4 is a diagram explaining the data structures of a border-in area and a border-out area of the one optical disc of the first example in more detail.

FIG. 5 is a data view conceptually showing an example of the data structure of another optical disc of the first example.

FIG. 6 are graphs conceptually showing a relationship between a position on a disc and a pre-address value in the another optical disc of the first example.

FIG. 7 is a diagram explaining the data structures of a border-in area and a border-out area of the another optical disc of the first example in more detail.

FIG. 8 is a data view conceptually showing an example of the data structure of an optical disc as a second example of the information recording medium of the present invention.

FIG. 9 is a block diagram showing an information recording/reproducing apparatus as an example of the information recording apparatus of the present invention.

FIG. 10 is a flowchart showing a flow of an operation in the case where data is recorded into a fixed-length block area, on the information recording apparatus of the example.

FIG. 11 is a flowchart showing a flow of a recording operation end process, on the information recording apparatus of the example.

FIG. 12 is a flowchart showing a flow of an operation in the case where data is recorded into a variable-length block area, on the information recording apparatus of the example.

FIG. 13 is a flowchart showing a flow of an operation in the case where data is recorded into fixed-length and variable-length combined block areas, on the information recording apparatus of the example.

FIG. 14 is a diagram conceptually showing an example of the data structure of the optical disc onto which data is recorded by a first modified operation example of the information recording apparatus of the present invention.

FIG. 15 are diagrams conceptually showing an example of the data structure of the optical disc onto which data is recorded by a second modified operation example of the information recording apparatus of the present invention.

FIG. 16 is a diagram conceptually showing one example of the data structure of the optical disc onto which data is recorded by a third modified operation example of the information recording apparatus of the present invention.

FIG. 17 is a diagram conceptually showing another example of the data structure of the optical disc onto which data is recorded by the third modified operation example of the information recording apparatus of the present invention.

FIG. 18 is a diagram conceptually showing another example of the data structure of the optical disc onto which data is recorded by the second modified operation example of the information recording apparatus of the present invention.

DESCRIPTION OF REFERENCE CODES 100, 100a, 100b, 100c, 100d Optical disc
102, 112 Lead-in area
103 File system
104 Border-in area
105, 115 Data recording area
106, 116 Interlayer buffer area
117 Border-out area
108, 118 Lead-out area
109, 119 Middle area
300 Information recording/reproducing apparatus
352 Optical pickup
354 CPU

BEST MODE FOR CARRYING OUT THE INVENTION

Hereinafter, as the best mode for carrying out the present invention, an information recording medium, an information recording apparatus, an information recording method, and a computer program in embodiments of the present invention will be discussed in order.

Embodiment of Information Recording Medium

An embodiment of the information recording medium of the present invention is provided with: a first recording layer and a second recording layer in each of which record information can be recorded, the information recording medium including a plurality of block areas, each of which is a unit of recording the record information and each of which includes a partial recording area of the first recording layer and a partial recording area of the second recording layer located in a position facing the partial recording area of the first recording layer.

According to the embodiment of the information recording medium of the present invention, it is possible to record the record information into each of the first recording layer and the second recording layer. The plurality of recording layers are formed in a laminated structure on one side of a substrate, for example.

Particularly in the embodiment, the record information is recorded into the block area including a partial recording area of the first recording layer and a partial recording area of the second recording layer. In particular, the partial recording area of the first recording layer and the partial recording area of the second recording layer face or are opposed to each other. The expression "face or are opposed to" in the present invention is a wide concept including not only the case where the partial recording area of the first recording layer corresponds to the partial recording area of the second recording layer, i.e. they have an address having the same positional relationship, but also the case where they have substantially the same address, and further including a relationship between the partial recording area of the first recording layer and the partial recording area of the second recording layer, in which eccentricity or the like is also considered, as described later. A plurality of block areas are included in the information recording medium. Then, the record information is recorded by a unit of each of the block areas. If the record information is additionally recorded following a recording operation once ended, the record information is recorded into a new block area. Since the record information is recorded into each block area as described above, it is possible to substantially uniform the size of the record information recorded in the first recording layer and the size of the record information recorded in the second recording layer. Namely, it is possible to substantially uniform the size of the recording area where the record information is recorded in the first recording layer and the size of the recording area where the record information is recorded in the second recording layer. Thus, as compared to an information recording medium on which the record information is recorded into the second recording layer after the record information is recorded in the entire first recording layer, it is possible to reduce or eliminate the size of an area necessary to record therein dummy data in a finalize process.

Consequently, according to the information recording medium in the embodiment, it is possible to reduce a time length required for the finalizing, resulting in an efficient recording operation.

In one aspect of the embodiment of the information recording medium of the present invention, at least one of the plurality of block areas is provided with: a management information area to record therein management information for managing the record information which is recorded into the at least one of the plurality of block areas; and a data recording area to record therein the record information.

According to this aspect, even in the case of the information recording medium including the plurality of block areas, as in a normal information recording medium, it is possible to properly reproduce the recorded information.

In an aspect of the information recording medium including the management information area or the like, as described above, a size of the data recording area of the first recording layer is larger than a size of the data recording area of the second recording layer. Alternatively, a size of the partial recording area of the first recording layer is larger than a size of the partial recording area of the second recording layer.

By virtue of such construction, it is possible to eliminate an influence of eccentricity or the like of the information recording medium, and it is possible to properly record the record information.

In another aspect of the embodiment of the information recording medium of the present invention, at least a last block area out of the plurality of block areas is in an unrecorded state such that the record information is unrecorded.

According to this aspect, the record information is not necessarily recorded in all the plurality of block areas. Therefore, it is no longer necessary to record the dummy data or the like, for example, onto the entire information recording medium in the finalize process, which allows a fast recording operation to be realized. In addition, it is possible to properly record the record information having an arbitrary or predetermined size (i.e. data amount), onto the information recording medium in the embodiment, and it is also possible to receive the above-mentioned various benefits. The "last block area" of the present invention herein is a concept indicating the block area into which the record information is recorded or could be recorded in the end of the procedure with which the record information is recorded, and it means the block area located on the outermost circumferential side if the record information is recorded from the inner to the outer circumferential side of the information recording medium.

In another aspect of the embodiment of the information recording medium of the present invention, dummy data is recorded in at least a last block area out of the plurality of block areas.

According to this aspect, even if the record information including contents or the like is not recorded in all the plurality of block areas, it is possible to properly reproduce the record information recorded on the information recording medium on a reproduce-only information reproducing apparatus or the like, by recording the dummy data in the finalizing or the like, for example. The "dummy data" of the present invention herein indicates data different from the data that a user originally desires to record (e.g. various content data, etc.), and the content of the data is no object.

In another aspect of the embodiment of the information recording medium of the present invention, the record information to be recorded in at least one of the plurality of block areas is adjacent to an interlayer buffer area to record therein buffer data for buffering a change operation of changing a recording layer which is a recording target, between the first recording layer and the second recording layer.

According to this aspect, by providing the interlayer buffer area adjacent to the record information to be recorded (i.e. adjacent to the data recording area), it is possible to effectively avoid the disadvantage that a recording area where the record information is not recorded is irradiated with laser light, for example. Namely, it is possible to effectively prevent a situation of runaway of an optical pickup described later.

In another aspect of the embodiment of the information recording medium of the present invention, at least one of the plurality of block areas is fixed-length.

According to this aspect, it is possible to properly record the record information into the block area whose size is fixed.

In another aspect of the embodiment of the information recording medium of the present invention, at least one of the plurality of block areas is variable-length.

According to this aspect, it is possible to properly record the record information into the block area having more proper size, in accordance with the size of the record information to be recorded.

In another aspect of the embodiment of the information recording medium of the present invention, a pre-record address for determining a position where the record information is recorded on the information recording medium is continuously given in the first recording layer and the second recording layer, and a physical address recorded with the record information onto the information recording medium is continuously recorded in each of the plurality of block areas.

According to this aspect, the physical address which is continuous in each of the plurality of block areas is recorded in the block area by an information recording apparatus described later, so that it is possible to properly record the record information even on the information recording medium provided with the plurality of block areas, and it is also possible to properly reproduce the record information.

An embodiment of the information recording apparatus of the present invention is provided with: a recording device for recording record information onto an information recording medium provided with: a first recording layer and a second recording layer in each of which the record information can be recorded; and a first controlling device for controlling the recording device to record the record information by a unit of each of a plurality of block areas, each of which includes a partial recording area of the first recording layer and a partial recording area of the second recording layer located in a position facing the partial recording area of the first recording layer.

According to the embodiment of the information recording apparatus of the present invention, by the operation of the recording device, it is possible to record the record information into the first recording layer or the second recording layer of the information recording medium. Particularly in the embodiment, by the operation of the first controlling device, the recording device is controlled to record the record information by a unit of the block area including the partial area of the first recording layer and the partial area of the second recording layer. Thus, it is possible to substantially uniform the size of the record information recorded in the first recording layer and the size of the record information recorded in the second recording layer. Thus, as compared to the case where the record information is recorded into the second recording layer after the record information is recorded in the entire first recording layer, it is possible to reduce or eliminate the size of an area necessary to record therein the dummy data in a finalize process. By this, it is possible to reduce a time length required for the finalizing, resulting in an efficient recording operation.

Moreover, even if additional recording of the record information is repeated, it is possible to maintain the situation such that the size of the record information recorded in the first recording layer is equal to the size of the record information recorded in the second recording layer because the record information is recorded by a unit of the block area. Thus, even if the record information is recorded only once, or even if the record information is additionally recorded, in any cases, it is possible to receive the above-mentioned various benefits.

Consequently, according to the embodiment of the information recording apparatus of the present invention, it is possible to record the record information by a unit of the block area. Therefore, it is possible to reduce a time length required for the finalizing, resulting in an efficient and fast recording operation.

Incidentally, in response to the various aspects in the embodiment of the information recording medium of the present invention, the embodiment of the information recording apparatus of the present invention can adopt various aspects.

In one aspect of the embodiment of the information recording apparatus of the present invention, the first controlling device controls the recording device to provide at least one of the plurality of block areas with a management information area (e.g. a border-in area and a border-out area, etc. described later) to record therein management information for managing the record information which is recorded into the at least one of the plurality of block areas.

By virtue of such construction, it is possible to properly perform the recording operation of recording the record information onto the information recording medium provided with the plurality of block areas, on the basis of the management information recorded in the management information area provided for each block area, for example. It is also possible to properly reproduce the record information recorded.

In another aspect of the embodiment of the information recording apparatus of the present invention, the first controlling device controls the recording device to provide at least one of the plurality of block areas with an interlayer buffer area, by recording buffer data for buffering a change operation of changing a recording layer which is a recording target, into each of the first recording layer and the second recording layer, when the recording layer is changed from the first recording layer to the second recording layer.

According to this aspect, by providing the interlayer buffer area, it is possible to effectively avoid the disadvantage that a recording area where the record information is not recorded is irradiated with laser light, in the reproduction of the information recording medium, for example.

In an aspect of the information recording apparatus in which the interlayer buffer area is provided, as described above, the information recording apparatus is further provided with: an ejection judging device for judging whether or not the information recording medium is ejected from the information recording apparatus, and the first controlling device controls the recording device to provide the interlayer buffer area if it is judged by the ejection judging device that the information recording medium is ejected.

By virtue of such construction, it is only necessary to provide the interlayer buffer area if the information recording medium is ejected, so that it is possible to improve the efficiency of the recording operation. In particular, if the record information is recorded into the plurality of block areas until the ejection, it is unnecessary to provide the interlayer buffer area every time the block area is changed. Thus, it is possible to further improve the efficiency of the recording operation.

In an aspect of the information recording apparatus in which the interlayer buffer area is provided, as described above, the information recording apparatus is further provided with: an ejection judging device for judging whether or not the information recording medium is ejected from the information recording apparatus, and the first controlling device controls the recording device to provide at least one of the plurality of block areas having the interlayer buffer area with a smaller size than a predetermined size of the interlayer buffer area, if the record information is recorded over the first recording layer and the second recording layer, and the first controlling device controls the recording device to provide the interlayer buffer area having the predetermined size, by recording the buffer data into an area following the interlayer buffer area having the smaller size, if it is judged by the ejection judging device that the information recording medium is ejected.

By virtue of such construction, if the information recording medium is not ejected, the relatively small interlayer buffer layer is provided. Then, if the information recording medium is ejected, the relatively large (i.e. normal size) interlayer buffer area is provided, by recording the buffer data into the area following the relatively small interlayer buffer area. By this, it is only necessary to provide the interlayer buffer area with minimum necessary size in the recording operation until the ejection, so that it is possible to further improve the efficiency of the recording operation.

In another aspect of the embodiment of the information recording apparatus of the present invention, at least one of plurality of block areas is fixed-length, the information recording apparatus is further provided with a size judging device for judging whether or not a size of the record information to be recorded are larger than a size of the at least one block area, and the first controlling device controls the recording device to divide and record the record information to be recorded, if it is judged by the size judging device that the size of the record information to be recorded are larger than the size of the at least one block area.

According to this aspect, it is possible to properly record the record information by a unit of the block area, regardless of the size of the fixed-length block area. Incidentally, there are a variety of aspects of the record information. For example, there is the record information including a series of content data and a single file or the like. Here, if the single file or the series of content data to be recorded at a time has a larger size than the size of the fixed-length block area, the file or the content data is preferably divided and recorded.

In an aspect of the information recording apparatus in which the record information is recorded into the fixed-length block area, as described above, it may be constructed such that the information recording apparatus is further provided with an ejection judging device for judging whether or not the information recording medium is ejected from the information recording apparatus, and that the first controlling device controls the recording device, if the record information is not recorded in the at least one portion of the at least one fixed-length block area, to record dummy data into the at least one portion of the at least one fixed-length block area.

By virtue of such construction, even if the record information smaller than the fixed-length block area is recorded, it is possible to eliminate a mirror portion where the record information is unrecorded, and particularly, it is possible to prevent the runaway of an optical pickup or the like described later. Therefore, it is possible to ensure the proper recording operation and also the proper reproduction operation.

In another aspect of the embodiment of the information recording apparatus of the present invention, at least one of plurality of block areas is variable-length, the information recording apparatus is further provided with a determining device for determining a size of the at least one variable-length block area, on the basis of a size of the record information to be recorded, and the first controlling device controls the recording device to record the record information to be recorded into the at least one variable-length block area having the size determined by the determining device.

According to this aspect, by the operation of the determining device, the size of the block area suitable for the recording of the record information is determined, in accordance with the size of the record information to be recorded. Therefore, it is possible to effectively use the recording capacity of the information recording medium.

In another aspect of the embodiment of the information recording apparatus of the present invention, the plurality of block areas include at least one fixed-length block area and at least one variable-length block area, the information recording apparatus is further provided with a measuring device for measuring a size of the record information to be recorded, and the first controlling device controls the recording device to record the record information into the at least one variable-length block area if the size of the record information to be recorded measured by the measuring device is equal to or larger than a predetermined size, and the first controlling device controls the recording device to record the record information into the at least one fixed-length block area if the dimensions measured by the measuring device is smaller than the predetermined dimensions.

According to this aspect, it is possible to select whether the record information is recorded into the fixed-length block area or the variable-length block area, as occasion demands, in accordance with the size of the record information to be recorded. Therefore, it is possible to record the record information to use the information recording medium, most effectively or more effectively.

In another aspect of the embodiment of the information recording apparatus of the present invention, the information recording medium has a pre-record address continuously given in the first recording layer and the second recording layer, the pre-record address determining a position where the record information is recorded on the information recording medium, and the information recording apparatus is further provided with an address giving device for giving a physical address recorded with the record information onto the information recording medium, so as to be continuous in each of the plurality of block areas.

According to this aspect, on the information recording medium, the pre-record address is given in advance to be distributed continuously (e.g. to increase monotonously or decrease monotonously) in each recording layer. Then, the physical address recorded with the record information by the operation of the information recording apparatus is given in each of the plurality of block areas to be distributed continuously in the block area, by the operation of the address giving device. By this, even if the record information is recorded into each of the plurality of block areas, it is possible to realize the proper recording operation.

In another aspect of the embodiment of the information recording apparatus of the present invention, the information recording medium has a pre-record address continuously given in the first recording layer and the second recording layer, the pre-record address determining a position where the record information is recorded on the information recording medium, and the information recording apparatus is further provided with an address giving device for giving a physical address recorded with the record information onto the information recording medium, so as to be proportional to the pre-record address.

According to this aspect, the physical address recorded with the record information by the operation of the information recording apparatus is given to be proportional to the pre-recording address, by the operation of the address giving device. For example, if the pre-record address is distributed to increase monotonously toward the outer circumferential side, the physical address is also given to increase monotonously toward the outer circumferential side. By this, even if the record information is recorded into each of the plurality of block areas, it is possible to realize the proper recording operation.

In another aspect of the embodiment of the information recording apparatus of the present invention, the information recording medium has a pre-record address continuously given in the first recording layer and the second recording layer, the pre-record address determining a position where the record information is recorded on the information recording medium, and the information recording apparatus is further provided with a second controlling device for controlling the recording device, to record discontinuity point information which indicates a discontinuity point of a relationship between a logical address, used when at least one of recording and reproduction of the record information is performed in each of the plurality of block areas, and a physical address recorded with the record information onto the information recording medium, into a management information area to record therein management information for managing the record information, and to record at least one of the record information and reproduction control information for controlling reproduction of the record information such that the logical address is continuous in each of the plurality of block areas.

According to this aspect, in reproducing the record information, the record information and/or the reproduction control information is recorded such that the logical address is continuously distributed in each of the plurality of block areas. Moreover, by recording the discontinuity point information onto the information recording medium and referring to this discontinuity point information at the time of the recording operation or reproduction operation of the record information, it is possible to properly provide consistency between the logical address and the physical address. By this, even if the record information is recorded into each of the plurality of block areas, it is possible to realize the proper reproduction operation (or recording operation).

In another aspect of the embodiment of the information recording apparatus of the present invention, the information recording medium has a pre-record address continuously given in the first recording layer and the second recording layer, the pre-record address determining a position where the record information is recorded on the information recording medium, and has discontinuity point information recorded in advance, the discontinuity point information indicating a discontinuity point of a relationship between a logical address, used when at least one of recording and reproduction of the record information is performed in each of the plurality of block areas, and a physical address recorded with the record information onto the information recording medium, and the information recording apparatus is further provided with a third controlling device for controlling the recording device, to record at least one of the record information and reproduction control information for controlling reproduction of the record information by using the logical address having a fixed relationship with the physical address which is proportional to the pre-record address.

According to this aspect, the record information or the reproduction control information is recorded such that the logical address is proportional to the pre-record address. Namely, the record information or the reproduction control information is recorded such that the logical address is in a fixed relationship with the physical address which is proportional to the pre-record address. Moreover, since the discontinuity point information is recorded in advance on the information recording medium, it is possible to properly provide consistency between the logical address and the physical address, by referring to the discontinuity point information at the time of the recording operation or reproduction operation for the record information. By this, even if the record information is recorded into each of the plurality of block areas, it is possible to realize the proper reproduction operation (or recording operation).

In another aspect of the embodiment of the information recording apparatus of the present invention, the information recording medium has a pre-record address continuously given in each of the plurality of block areas, the pre-record address determining a position where the record information is recorded on the information recording medium, and the information recording apparatus is further provided with a fourth controlling device for controlling the recording device to record at least one of the record information and reproduction control information for controlling reproduction of the record information such that a logical address used when at least one of recording and reproduction of the record information is performed is continuous in each of the plurality of block areas.

According to this aspect, even if the pre-record address is given in each of the plurality of block areas to be distributed continuously in the individual block area, along with that, the record information or the reproduction control information is recorded such that the logical address is continuous in the individual block area. Thus, it is possible to realize the proper reproduction operation (or recording operation).

In another aspect of the embodiment of the information recording apparatus of the present invention, the information recording medium has a pre-record address continuously given in each of the plurality of block areas, the pre-record address determining a position where the record information is recorded on the information recording medium, and the information recording apparatus is further provided with a fifth controlling device for controlling the recording device, to record at least one of the record information and reproduction control information for controlling reproduction of the record information such that a logical address used when at least one of recording and reproduction of the record information is performed is proportional to the pre-record address.

According to this aspect, even if the pre-record address is given in each of the plurality of block areas to be distributed continuously in the individual block area, along with that, the record information or the reproduction control information is recorded such that the logical address is proportional to the pre-address. Thus, it is possible to realize the proper reproduction operation (or recording operation).

An embodiment of the information recording method of the present invention is provided with: a recording process of recording record information onto an information recording medium provided with: a first recording layer and a second recording layer in each of which the record information can be recorded; and a first controlling process of controlling the recording process to record the record information by a unit of each of a plurality of block areas, each of which includes a partial recording area of the first recording layer and a partial recording area of the second recording layer located in a position facing the partial recording area of the first recording layer.

According to the embodiment of the information recording method of the present invention, as in the above-mentioned embodiment of the information recording apparatus of the present invention, it is possible to record the record information in the recording process. Then, by the control of the first controlling process, the record information is recorded in each of the block areas. Therefore, it is possible to receive the various benefits owned by the above-mentioned embodiment of the information recording apparatus of the present invention.

Incidentally, in response to the various aspects in the embodiment of the information recording apparatus of the present invention, the embodiment of the information recording method of the present invention can adopt various aspects.

An embodiment of the computer program of the present invention is a computer program for record/reproduction control to control a computer provided in the above-mentioned embodiment of the information recording apparatus (including its various aspects), to make the computer function as at least one portion of the recording device and the first controlling device.

According to the embodiment of the computer program of the present invention, the above-described embodiment of the information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the embodiment of the information recording apparatus of the present invention, the embodiment of the computer program of the present invention can adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one portion of the recording device and the first controlling device.

According to the computer program product of the present invention, at least one portion of the recording device and the first controlling device of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one portion of the recording device and the first controlling device of the present invention described above.

These effects and other advantages of the present invention will become more apparent from the following examples.

As explained above, the embodiment of the information recording medium of the present invention includes the plurality of block areas, each including one portion of the first recording layer and one portion of the second recording layer. Therefore, it is possible to record the record information into each of the first recording layer and the second recording layer, substantially uniformly, resulting in a fast finalize process.

Moreover, the embodiment of the information recording apparatus of the present invention is provided with the recording device and the first controlling device, and the embodiment of the information recording method of the present invention is provided with the recording process and the first controlling process. Therefore, it is possible to reduce a time length required for the finalize process, resulting in an efficient and fast recording operation.

EXAMPLES

Hereinafter, examples of the present invention will be explained with reference to the drawings.

Examples of Information Recording Medium

Firstly, with reference to FIG. 1 to FIG. 8, examples of the information recording medium of the present invention will be explained.

(1) First Example

With reference to FIG. 1 to FIG. 7, the first example of the information recording medium of the present invention will be explained.

Firstly, with reference to FIG. 1, an explanation will be given for the basic structure of an optical disc associated with an information recording medium in a first example which is a target of the information recording apparatus of the present invention. FIG. 1 are a substantial plan view showing the basic structure of an optical disc having a plurality of recording areas associated with an information recording medium in the first example which is a target of the information recording apparatus of the present invention, and a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a center hole 101 as being the center; a lead-in area 102 (112); a data recording area 105 (115); and a lead-out area 108 (118) or a middle area 109 (119). Then, recording layers or the like are laminated on a transparent substrate 200, for example. In each recording area of the recording layers, a track or tracks, such as a groove track and a land track, are alternately placed, spirally or concentrically, centered on the center hole 101. Moreover, on the track, data is divided by a unit of ECC block and recorded. The ECC block is a data management unit by a pre format address, in which the record information is error correctable.

Incidentally, the present invention is not particularly limited to the optical disc having the three areas as described above. For example, even if the lead-in area 102 (112) and the lead-out area 108 (118) or the middle area 109 (119) do not exist, a data structure or the like explained below can be constructed. Moreover, as described later, the lead-in area 102 (112) and the lead-out area 108 (118) or the middle area 109 (119) may be further segmentized.

Particularly, the optical disc 100 in the example, as shown in FIG. 1(b), has such a structure that a L0 layer and a L1 layer, which constitute one example of the "first and second recording layers" of the present invention, respectively, are laminated on the transparent substrate, for example. Upon the recording and reproduction of such a two-layer type optical disc 100, the data recording/reproduction in the L0 layer or the L1 layer is performed, depending on which recording layer has the focus position of laser light LB, irradiated from the lower side to the upper side in FIG. 1(b). Moreover, the optical disc 100 in the example is not limited to a two-layer, single-sided type, i.e., a dual layer type, but may be a two-layer, double-sided type, i.e. a dual layer, double-sided type. Furthermore, the optical disc 100 in the example is not limited to the optical disc having the two recording layers, as described above, but may be an optical disc of a multilayer type which has three or more layers.

Incidentally, the recording or reproduction procedure of the two-layer type optical disc in an opposite track path method and a parallel track path method, and the data structure of each layer will be described later.

Next, with reference to FIG. 2, the data structure of an opposite track path optical disc in the first example of the information recording medium will be explained in more detail. FIG. 2 is a data view conceptually showing an example of the data structure of an optical disc in the first example.

As shown in FIG. 2, the optical disc 100 has two recording layers (i.e. the L0 layer and the L1 layer). The L0 layer is provided with the lead-in area 102 and the middle area 109, and the L1 layer is provided with the lead-out area 118 and the middle area 119. The optical disc 100 in the first example particularly has a plurality of block areas in the data recording area in each of the L0 layer and the L1 layer. Then, various content data, such as movie data and audio data, for example, and other various data or the like are recorded by a unit of this block area. Namely, some movie data is recorded into a block area A, for example, and some music data is recorded into a block area B, for example, and some data for PC is recorded into a block area C, for example.

Explaining this block area in more detail, each block area is provided with: a border-in area 104 which is one specific example of the "management information area" of the present invention; a data recording area 105 (115); an interlayer buffer area 106 (116); and a border-out area 117 which is one specific example of the "management information area" of the present invention. However, in the block area A corresponding to the first block area viewed from the lead-in area 102, the border-in area 104 is not provided because management information is recorded in the lead-in area 102 (specifically, a control data zone to record therein the management information is provided). Namely, the block area A includes: data recording areas 105a and 115a; interlayer buffer areas 106a and 116a; and a border-out area 117a. The block area B includes: a border-in area 104b; data recording areas 105b and 115b; interlayer buffer areas 106b and 116b; and a border-out area 117b. The block area C includes: a border-in area 104c; data recording areas 105c and 115c; interlayer buffer areas 106c and 116c; and a border-out area 117c.

The border-in area 104 is an area to record therein the management information (e.g. updated physical format information, described later) for managing data recorded in each block area, and has dimensions or a size of several μm in an outer circumferential direction from the inner circumference of the optical disc 100, for example. The border-in area 104 will be discussed in detail later (refer to FIG. 4).

The data recording area 105 (115) is an area to record therein the content data and the other various data. In the first example, the size of the data recording area 105 (115) are determined in advance. The data recording area 105 and the data recording area 115 included in the same block area preferably have such a relationship that they are disposed in the same position or substantially the same position when viewed from an optical pickup side. Namely, each is preferably an area having a corresponding address.

The interlayer buffer area 106 (116) is an area disposed in respective one of the L0 layer and L1 layer, in a point where the recording layer which is a data recording target is changed from the L0 layer to the L1 layer. Specifically, in the interlayer buffer area 106 (116), the actual content data or the like is not recorded, and dummy data, such as "00h" data, for example, is recorded. The interlayer buffer area 106 (116) preferably has the size of approximately 0.5 mm in the radial direction in the first block area A, and preferably has the size of approximately 0.1 mm in the subsequent block areas (e.g. the block areas B and C). However, it is not limited to these sizes, and it is only necessary to have size large enough to prevent penetration of the optical pickup, as described later.

The border-out area 117 is an area to record therein various control information for controlling a recording operation when data is recorded into each block area and a reproduction operation when the recorded data is reproduced, and it has the size of approximately 100 to 500 μm in the outer circumferential direction from the inner circumference of the optical disc 100, for example. The border-out area 117 will be discussed in detail later (refer to FIG. 4).

Then, the content data and various data are recorded in order, starting from the block area A, then, to the block area B and the block area C. Then, in each block area, as shown by arrows in FIG. 2, the recording is performed from the inner circumferential side of the data recording area 105 in the L0 layer, and then, from the outer circumferential side of the data recording area 115 in the L1 layer.

By virtue of such construction that data is recorded into each of the plurality of block areas, it is possible to sequentially record the data from the inner circumferential side in each of the L0 layer and the L1 layer. Thus, there is such an advantage that, in the finalize process for the optical disc, a time length required for the process is relatively short. In particular, in the case of an optical disc having the aspect that data is recorded into the L1 layer after data is recorded in the entire L0 layer, there is such a technical problem that a time length required for the finalizing is relatively long, as compared to the amount of the data recorded on the entire optical disc, because the data is recorded in the entire L0 layer whereas the data is hardly recorded in the L1 layer. This is because it requires a time length to record the dummy data into an area where data is not recorded in the L1 layer. However, according to this example, various data is recorded into each block area, so that it is possible to record the data, substantially uniformly (or equally), into each of the L0 layer and the L1 layer. In other words, it is possible to substantially uniform the size of a data-recorded recording area of the L0 layer and the size of a data-recorded recording area of L1 layer. Therefore, upon the finalizing, it is unnecessary to record the dummy data into the L1 layer, as described above. In other words, on the outer circumferential side of the middle area 108 (118), an unrecorded state (i.e. mirror state) can remain. Thus, it is possible to reduce a time length required for the finalize process, so that it is possible to contribute to the reduction in a recording time length and improvement of user's comfort, or the like.

Moreover, particularly by providing the interlayer buffer area 106 (116) for an area corresponding to a boundary of each block area, it is possible to prevent the penetration of the optical pickup (or laser light irradiated from the optical pickup) which searches for a predetermined recording position on the optical disc 100, for example. The "penetration" herein indicates that a searching target leaps over the data recording area 105a to a data-unrecorded area (e.g. a mirror area) when the data recording area 105a is searched, in the case where there is only the block area A provided on the optical disc 100, for example. Such penetration of the optical pickup possibly leads to runaway of the subsequent recording operation and reproduction operation, which is not preferable. However, according to this example, since there is provided the interlayer buffer area 106 (116) having a predetermined radial width (e.g. 0.5 mm and 0.1 mm, as described above) at the boundary, it is possible to properly prevent such penetration. In addition, by virtue of the interlayer buffer area 106 (116), it is possible to prevent the laser light from entering the data-unrecorded area after layer jump, due to a bonding shift or eccentricity between the two recording layers or a shift in the irradiation position of the laser light, when the "layer jump" which is a change operation of changing the recording layer which is a recording target between the L0 layer and the L1 layer is performed.

Moreover, considering an influence of the eccentricity and the like, for example, it may be constructed such that the size of the data recording area 105 of the L0 layer is larger than the size of the data recording area 115 of the L1 layer. This is the same in each block area. Particularly in this case, the data recording area 115 of the L1 layer is preferably disposed only in a position corresponding to the data recording area 105 of the L0 layer. By this, if data is recorded into the L1 layer, the laser light can be always irradiated through the L0 layer where data is recorded. Thus, it is possible to improve recording features.

Incidentally, the middle area 109 (119) may be directly provided, without the interlayer buffer area 106c (116c) disposed in the block area located on the outermost circumference (i.e. one specific example of the "last block area" of the present invention). In addition, the various content data or the like is not necessarily recorded in all the block areas. In this case, the middle area may be disposed on the outermost circumferential side of the data-recorded area (i.e. it may be in the mirror state on the outer circumferential side of the middle area), or the dummy data (e.g. "00h" data, etc.) may be recorded into the data-unrecorded area. Now, with regard to the optical disc 100, a relationship between its physical address and logical address which is referred by an information recording/reproducing apparatus described later will be explained with reference to FIG. 3. FIG. 3 are graphs conceptually showing a relationship among a position on a disc and a pre-address value and a physical address value in the one optical disc in the first example. Incidentally, the pre-address indicates a peculiar address given in advance to the optical disc 100. The physical address indicates a peculiar address recorded with data at each recording position on the optical disc, and indicates an address used when the drive side of the information recording/reproducing apparatus records or reproduces the data. Moreover, the logical address indicates an address actually used when the host side of the information recording/reproducing apparatus records or reproduces the data. Particularly in the first example, this logical address is a series of values continued in one block area.

As shown in FIG. 3(a), with regard to the pre-address of the optical disc 100 in the first example, its address value increases in the L0 layer with movement from the inner to the outer circumferential side whereas its address value decreases in the L1 layer with movement from the inner to the outer circumferential side. Then, an address value of the L0 layer and an address value of the L1 layer in the same radial position have a complement number relationship with each other. As described above, if the pre-address is continuously distributed in the optical disc 100, of course, the pre-address is continuously distributed in the individual block area. Incidentally, it may be constructed such that the pre-address is not continuously distributed in the optical disc 100, and the pre-address is continuously distributed in the individual block area.

Then, the physical address recorded with data by the information recording apparatus descried later may be given so as to be identical to (or proportional to) the pre-address, as shown in FIG. 3(b). Alternatively, as shown in FIG. 3(c), it may be given so as to take continuous address values in one block area. Adding an explanation to the physical address shown in FIG. 3(c), in the L0 layer in one block area, firstly, the physical address increases monotonously with movement from the inner to the outer circumferential side. Then, in a recording position where the laser jump is performed from the L0 layer to the L1 layer, the physical address is given such that the last physical address of the L0 layer is continuous with the first physical address of the L1 layer. Then, in the L1 layer in the one block area, the physical address is given to increase monotonously with movement from the outer to the inner circumferential side and to maintain continuity with the L0 layer.

If the logical address is expressed by the physical address, for example, in FIG. 3(b), the logical address is a value obtained by subtracting the first sector address of the data recording area from a sector address (i.e. physical address) at a point in the L0 layer. If the sector address is p0 and the first sector address of the data recording area is "30000", for example, the logical address l0 is expressed by l0=p0−30000.

On the other hand, in the L1 layer, the logical address is a value obtained by firstly subtracting the end sector address of the L1 layer (i.e. the end sector address of the middle area 116) from the sector address at a point and then adding the end logical address of the L0 layer (i.e. the logical address at the end point of the middle area 106). If the sector address is p1 and the end sector addresses of the middle areas 106 and 116 are respectively p0(last) and p1(last), the logical address l1 is l1=p1−p1(last)+(p0(last)−30000)+1. By giving the logical address in this manner, it is possible to realize the logical address continuously distributed in one block area.

Incidentally, even with regard to the logical address, it may not be given to be continuously distributed in one block area, but may be given to be proportional to the pre-address, for example, as in the physical address.

Moreover, information indicating a discontinuity point between the logical address and the physical address (e.g. the pre-address and the physical address of the discontinuity point, etc.) may be recorded in the border-in area 104 and the border-out area 117. For example, in FIG. 3, the boundary of the two interlayer buffer areas in each block area (i.e. the recording position where the layer jump is performed) corresponds to the discontinuity point. Then, with reference to the position information indicating the discontinuity point, the information recording/reproducing apparatus described later can record or reproduce the data, while maintaining consistency of the relationship among the pre-address, the physical address and the logical address. Moreover, such a discontinuity point may be recorded in advance on the optical disc 100, or may be recorded onto the optical disc 100 by the information recording/reproducing apparatus described later.

Next, the data structures of the border-in area and the border-out area of the optical disc in the first example will be explained in more detail, with reference to FIG. 4. FIG. 4 is a diagram explaining the data structures of the border-in area and the border-out area of the optical disc in the first example in more detail.

As shown in FIG. 4, on the basis of the predetermined data recording area 105b (115b), the border-in area 104b of the block area including the data recording area 105b (115b) (i.e. the block area B in FIG. 2) and the border-out area 117a of the block area (i.e. the block area A) located one before the above-mentioned block area including the data recording area 105b (115b) make a pair and form one border zone.

In the border-in area 104b, updated physical format information as one specific example of the "management information" of the present invention is recorded. This updated physical format information is recorded in the lead-in area 102, and it is information indicating data distribution information (e.g. mapping information, etc.) in the data recording area 105 (115). Incidentally, the updated physical format information which is recorded into the border-in area 104b may not indicate the data distribution information about the entire data recording area 105 (115), but may indicate at least the data distribution information about the corresponding data recording area 105b (115b). Then, the updated physical format information has a size corresponding to 5 ECC blocks; however, it is not limited to this size.

The border-out area 117a has a first border-out area 117a-1 and a second border-out area 117a-2, each having the same size. In the first border-out area 117a-1, a RMD copy and a stop block are recorded.

The RMD copy is information for managing data recording, and includes the same information as RMD (Recording Management Data) recorded in the lead-in area 102. The RMD copy can provide information (i.e. RMD) for reproducing various data recorded in each block area, to a DVD-ROM only drive incapable of reading a RM (Recording Management) area in the lead-in area 102 of a DVD-R, for example.

The stop block includes flag information with a size of 2 ECC blocks, for example, and indicates whether or not data is recorded after the border-out area 117a. Namely, if it is judged on the basis of the stop block that data is not recorded, an information reproducing apparatus for reproducing the data recorded on the optical disc 100 does not read a subsequent area.

In the border-out area 117a-2, a next border marker is recorded. For example, this next border marker is indicated by recording 3 data each of which has a size of 2 ECC blocks, for example. The next border marker is information used by the information recording apparatus for recording the data onto the optical disc 100. Specifically, if data is further recorded following the border-out area 117a, predetermined data (e.g. "00h") is recorded as the next border marker. On the other hand, if data is not further recorded following the border-out area 117a, the border-out area 117a-2 is in the mirror state (i.e. unrecorded state).

Moreover, not only the above-mentioned opposite track path optical disc, but also a parallel track path optical disc as shown in FIG. 5 may be adopted. Hereinafter, with reference to FIG. 5 and FIG. 7, as a modified example of the optical disc in the first example, the parallel track path optical disc will be explained. FIG. 5 is a data view conceptually showing an example of the data structure of an optical disc in the modified example. FIG. 6 are graphs conceptually showing a relationship among a position on a disc and a pre-address value and a physical address value in the optical disc in the first example. FIG. 7 is a diagram explaining the data structures of a border-in area and a border-out area of the optical disc in the modified example.

As shown in FIG. 5, even with regard to a parallel track path optical disc 100a, data is recorded by a unit of block area, as in the opposite parallel track optical disc 100. Then, the data structure of each block area is the same as that of the opposite parallel track optical disc 100. Then, data is recorded from the inner circumferential side of the data recording area 105a of the L0 layer, and then data is recorded from the inner circumferential side of the data recording area 115a of the L1 layer, and the same recording aspect is continued after that.

As shown in FIG. 6(a), in the parallel track path optical disc 100a, the pre-address increases with movement from the inner to the outer circumferential side in each of the L0 layer and the L1 layer. Then, as shown in FIG. 6(b), the physical address may be given to increase with movement from the inner to the outer circumferential side in each recording layer. Of course, as shown in FIG. 6(c), the physical address may be given to be continuously distributed in one block area. Even in this case, as in the case where an explanation is made in FIG. 3, the logical address take continuous values in one block area. Specifically, the logical address continuously increases with movement shown by arrows in FIG. 5, and the logical address is continuous at the end point of the interlayer buffer area 106 and at the first point of the interlayer buffer area 116.

As shown in FIG. 7, even in the parallel track path optical disc 100a, the data structures of the border-in area 104 and the border-out area 117 are the same as those of the opposite track path optical disc 100. The border-in area 104b including the management information of the certain data recording area 115b and the border-out area 117a recorded before the border-in area 104b make a pair and form one border zone.

Consequently, according to the optical disc 100 (moreover, the optical disc 100a in the modified example) in the first example, various data is recorded into each block area, so that it is possible to record the data, substantially uniformly, into each of the L0 layer and the L1 layer. Thus, it is possible to reduce a time length required for the finalize process, so that it is possible to contribute to the reduction in a recording time length and improvement of user's comfort, or the like.

(2) Second Example

Next, with reference to FIG. 8, the second example of the information recording medium of the present invention will be explained. FIG. 8 is a data view conceptually showing an example of the data structure of an optical disc in the second example.

As shown in FIG. 8, an optical disc 100b in the second example also adopts the same data structure as that of the optical disc 100 in the first example. Namely, the data recording area 105 (115) is divided into a plurality of block areas, and each block area is provided with: the border-in area 104; the data recording area 105 (115); the border-out area 117; and the interlayer buffer area 106 (116).

In particular, in the optical disc 100b in the second example, the data recording area 105 (115) in each block area is variable-length. Explaining it specifically, the sizes of the data recording area 105 (115) in each of the block area A, the block are B, and the block area C are different.

The sizes of the data recording area 105 (115) in each block area, as described later, may be determined depending on the size of data to be recorded onto the optical disc 100b, or may be determined by a user who uses the optical disc 100b.

As descried above, by setting the sizes of the data recording area 105 (115) in each block area to be variable-length, it is possible to record the data by a unit of block area having optimum or proper size depending to the size of data to be recorded.

Consequently, according to the optical disc in the second example, it has the benefit owned by the optical disc in the first example and also has an excellent benefit that the recording capacity of the optical disc is effectively used.

Incidentally, it is obvious that even an optical disc including both a variable-length block area and a fixed-length block area, is included within the scope of the present invention.

Information Recording/Reproducing Apparatus

Next, with reference to FIG. 9 to FIG. 15, an explanation will be given for the structure and the operation of an information recording/reproducing apparatus as an example of the information recording apparatus of the present invention.

(1) Basic Structure

Firstly, with reference to FIG. 9, the basic structure of an information recording/reproducing apparatus 300 in the example of the present invention will be explained. FIG. 9 is a block diagram showing the information recording/reproducing apparatus 300 in the example of the present invention. Incidentally, the information recording/reproducing apparatus 300 has a function of recording record data onto the optical disc 100 and a function of reproducing the record data recorded on the optical disc 100.

With reference to FIG. 9, the inner structure of the information recording/reproducing apparatus 300 will be explained. The information recording/reproducing apparatus 300 is an apparatus for recording information onto the optical disc 100 and reading the information recorded on the optical disc 100, under the control of a CPU 354.

The information recording apparatus 300 is provided with: the optical disc 100; a spindle motor 351; an optical pickup 352; a signal recording/reproducing device 353; the CPU (drive control device) 354; a memory 355; a data input/output control device 306; an operation button 310; a display panel 311; and a bus 357.

The spindle motor 351 is intended to rotate and stop the optical disc 100, and operates in accessing the optical disc 100. More specifically, the spindle motor 351 is constructed to rotate and stop the optical disc 100 at a predetermined speed, under spindle servo from a not-illustrated servo unit or the like.

The optical pickup 352, which is one specific example of the "recording device" of the present invention, is to perform the recording/reproduction with respect to the optical disc 100, and is provided with a laser device, a lens, and the like. More specifically, the optical pickup 352 irradiates the optical disc 100 with a light beam, such as a laser beam, as reading light with a first power upon reproduction, and as writing light with a second power upon recording with it modulated.

The signal recording/reproducing device 353 controls the spindle motor 351 and the optical pickup 352, to thereby perform the recording/reproduction with respect to the optical disc 100.

The memory 355 is used in the general data processing and the OPC process or the like on the disc drive 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device is stored; a buffer used for compression/decompression of video data; a RAM area into which a parameter required for a program operation or the like is stored; and the like.

The CPU (drive control device) 354 is connected to the signal recording/reproducing device 353 and the memory 355 through the bus 357, and controls the entire information recording/reproducing apparatus 300 by giving an instruction to each controlling device. Normally, software for operating the CPU 354 is stored in the memory 355.

The data input/output control device 306 controls the input/output of the data from the exterior with respect to the information recording/reproducing apparatus 300, to thereby perform storage to and export from the data buffer on the memory 355. If the input/output of the data is a video signal, when the data is inputted, the data received from the exterior is compressed (encoded) in a MPEG format and outputted to the memory 355. When the data is outputted, the data in the MPEG format received from the memory 355 is decompressed (decoded) and outputted to the exterior.

An operation control device 307 receives an operation instruction with respect to the information recording/reproducing apparatus 300 and performs display, and transmits an instruction from the operation button 310, such as an instruction to record or reproduce, to the CPU 354. The operation control device 307 outputs the operational state of the information recording/reproducing apparatus 300, such as during recording and during reproduction, to the display panel 311, such as a fluorescent tube.

Household equipment as one specific example of the information recording/reproducing apparatus 300 explained above, is recorder equipment for recording and reproducing video images. The recorder equipment records a video signal from a broadcast reception tuner and an external connection terminal, onto a disc, and outputs the video signal reproduced from the disc, to external display equipment, such as a television. The operation as the recorder equipment is performed by executing a program stored in the memory 355, on the CPU 354.

(2) Operation Principle

Next, the basic operation principle of the information recording apparatus 300 in the example will be explained with reference to FIG. 10 to FIG. 13. FIG. 10 is a flowchart showing a flow of an operation in the case where data is recorded into a fixed-length block area. FIG. 11 is a flowchart showing a flow of an end process of a recording operation. FIG. 12 is a flowchart showing a flow of an operation in the case where data is recorded into a variable-length block area. FIG. 13 is a flowchart showing a flow of an operation in the case where data is recorded into fixed-length and variable-length combined block areas.

Firstly, an explanation will be given for the aspect that data is recorded into the fixed-length block area, as shown in FIG. 2 or FIG. 5.

As shown in FIG. 10, by virtue of the CPU 354 as one specific example of the "size judging device" of the present invention, firstly, it is judged whether or not the size of data to be recorded in the recording operation is larger than the size of the block area (step S101).

As a result of the judgment, if it is judged that the size of the block area is larger (the step S101: No), the data to be recorded is recorded into one portion of the block area, under the control of the CPU 354 as one specific example of the "first controlling device" of the present invention (step S102). At this time, if the data to be recorded extends across the L0 layer and the L1 layer, the above-mentioned interlayer buffer area 106 (116) is generated. Incidentally, at this time, if data is recorded into the block area (i.e. the block areas B and C) other than the innermost circumferential block area, the data to be recorded is recorded by making a space corresponding to the border-in area 104.

Then, after that, a border close process is performed. Specifically, the border-in area 104 and the border-out area 117 described above are generated, and necessary various information or the like is recorded (step S103).

Moreover, at this time, under the control of the CPU 354 as one specific example of at least one of the "address giving device", the "second controlling device", the "third controlling device", the "fourth controlling device", and the "fifth controlling device" of the present invention, various data is preferably recorded to maintain consistency among the pre-address, the physical address and the logical address. Namely, in recording the data onto the opposite track path optical disc 100, for example, it is preferable that various addresses are distributed as shown in FIG. 3, for example. In recording data onto the parallel track path optical disc 100, for example, it is preferable that various addresses are distributed as shown in FIG. 6, for example.

On the other hand, as a result of the judgment in the step S101, if it is judged that the size of the data to be recorded is larger (the step S101: Yes), one portion of the data to be recorded is recorded into the entire one block area (e.g. the entire block area A in FIG. 2), under the control of the CPU 354 as one specific example of the "first controlling device" of the present invention (step S104). Then, the border close process is performed in the one block area (step S105).

Then, the rest of the data to be recorded, which is unrecorded yet, is recorded into one portion of another block area (e.g. the block area B in FIG. 2) (step S106). Then, the border close process is performed in the another block area (step S107).

More specifically, if the size of each block area is 2 GB and the size of the data to be recorded is 3 GB, 2 GB of the data is recorded into the one block area and 1 GB of the data is recorded into the another block area.

Of course, if data having a larger size than the total size of the two block areas is recorded, one portion of the data may be recorded into all of the first block area and the second block area, and the rest of the data may be recorded into third block area (e.g. the block area C in FIG. 2).

After that, dummy data is recorded into a recording area where data is not recorded, out of the block areas used in the recording operation (step S108). As the dummy data, for example, "00h" data may be recorded. The process of recording the dummy data may be performed simultaneously with the border close process in the step S107. Moreover, the recording of data may be continued instead of recording the dummy data.

Then, by the operation of the CPU 354, for example, it is judged whether or not the recording operation is ended (step S109). Namely, it is judged whether or not the recording of all the data to be recorded in the recording operation is ended.

As a result of the judgment, if it is judged that the recording operation is not ended (the step S109: No), the operational flow returns to the step S101 again, and the data to be recorded is further recorded. On the other hand, if it is judged that the recording operation is ended (the step S109: Yes), the recording operation end process is performed (step S110).

Now, with reference to FIG. 11, the recording operation end process is explained.

As shown in FIG. 11, by the operation of the CPU 354, for example, firstly, it is judged whether or not the finalize process is performed (step S201). This finalize process is a process for making it possible to reproduce information, which is recorded on the optical disc by the information recording apparatus such as a DVD-R/RW recorder, on the information reproducing apparatus such as a DVD-ROM player.

As a result of the judgment, if it is judged that the finalize process is performed (the step S201: Yes), the finalize process is performed under the control of the CPU 354 (step S202). Specifically, necessary various management information or the like is recorded into the lead-in area 102 and the lead-out area 108. Then, the middle areas 109 and 119 are generated on the outermost circumferential side of an area where data is recorded. Into the middle areas 109 and 119, for example, "00h" data is recorded.

Here, in the case where data is recorded into the L1 layer after data is recorded into the entire L0 layer, it is necessary to record dummy data into an area where the data is not recorded. This is a process necessary to maintain compatibility with a reproduce-only player for a DVD-ROM or the like. Therefore, if 5 GB data is recorded onto an optical disc including the L0 layer and the L1 layer each of which has a recording capacity of 4 GB, 4 GB of the data is recorded into the L0 layer and 1 GB of the data is recorded into the L1 layer. In this case, in the finalize process, it is necessary to record dummy data into a space area equivalent to the rest of 3 GB in the L1 layer. This leads to an increase in a time length required for the finalize process.

However, according to the example, substantially uniform data is recorded into each of the L0 layer and the L1 layer, by the operation related to the step S101 to the step S107 in FIG. 10. Namely, the data is recorded up to substantially the same radial position in each of the L0 layer and the L1 layer. For example, if 5 GB data is recorded onto an optical disc including the L0 layer and the L1 layer each of which has a recording capacity of 4 GB, 2.5 GB of the data is recorded into each of the L0 layer and the L1 layer. Therefore, if the middle area (or the interlayer buffer area) is generated in an outermost circumferential area where the data is recorded, it is unnecessary to record the dummy data into an unrecorded area, as described above. Thus, there is a great advantage that it is possible to reduce a time length required for the finalize process.

Incidentally, even if the finalize process is not performed, the reproduction can be performed on a DVD-ROM player capable of recognizing the multi border structure of the optical disc by recording various management information or the like in the border-in area 104 and the border-out area 117.

On the other hand, if it is judged that the finalize process is not performed (the step S201: No), then, it is judged whether or not the optical disc is ejected, under the control of the CPU 354 as one specific example of the "ejection judging device" of the present invention (step S203). For example, it may be judged that the optical disc is ejected, if an ejection instruction is given from a user of the information recording/reproducing apparatus 300.

As a result of the judgment, if it is judged that the optical disc is ejected (the step S203: Yes), the optical disc is ejected from the information recording/reproducing apparatus 300 (step S204).

Next, an explanation will be given for the aspect that data is recorded into the variable-length block area as shown in FIG. 8.

As shown in FIG. 12, under the control of the CPU 354, the data size of the data to be recorded in the recording operation is obtained (step S301). Then, the size of the block area required for the data recording is determined by the operation of the CPU 354 as one specific example of the "determining device" of the present invention (step S302). Specifically, the size of the block area required is a total of the size of the border-in area 104 and the border-out area 117, the size of the data recording area 105 (115) required for the data recording and the size of the interlayer buffer area 106 (116).

Then, the data to be recorded is recorded into this block area (step S303), and the border close process is performed (the step S103).

After that, as in the operation in the step S109 and the step S110 in FIG. 10, it is judged whether or not the recording is ended, and the recording operation end process is performed.

By recording the data into each block area in this manner, it is possible to record the data, substantially uniformly, into each of the L0 layer and the L1 layer. Thus, it is possible to reduce a time length required for the finalize process, as described above, so that it is possible to contribute to the reduction in a recording time length and improvement of user's comfort, or the like.

Moreover, by recording the data into each variable-length block area, it is possible to properly allocate the block area depending on the size of the data to be recorded. Therefore, it is possible to use the recording capacity of the optical disc, more effectively.

Moreover, with reference to FIG. 13, an explanation will be given for the aspect that data is recorded with selecting the variable-length block area and the fixed-length block area, as occasion demands.

As shown in FIG. 13, under the control of the CPU 354 as one specific example of the "measuring device" of the present invention, firstly, the size of the data to be recorded is obtained (the step S301). Then, under the control of the CPU 354, it is judged whether or not the obtained size of the data is larger than a predetermined size (step S401). This predetermined size is a criterial parameter for judging whether the data to be recorded is recorded into the variable-length block area or into the fixed-length block area. For example, in the case where it is judged that the data to be recorded is recorded into the variable-length block area if the data is larger than 5 KB, and the data is recorded into the fixed-length block area if the data is equal to or less than 5 KB, this "5 KB" is the parameter indicating the predetermined size, and is one specific example of the "predetermined size" of the present invention. Then, the predetermined size may be determined in advance by a manufacturer of an information recording apparatus 1 or the like, or determined at each time of the judging operation or in advance by a user of the information recording apparatus 1.

As a result of the judgment, if it is judged that the size of the data to be recorded is larger than the predetermined size (the step S401: Yes), the data to be recorded is recorded into the variable-length block area (step S402). The recording operation for the variable-length block area herein is preferably performed in the same manner as the recording operation explained above in FIG. 12. Namely, the size of the block area is preferably determined depending on the size of the data to be recorded.

On the other hand, if it is judged that the size of the data to be recorded is not larger than the predetermined size (the step S401: No), the data to be recorded is recorded into the fixed-length block area (step S403). The recording operation for the fixed-length block area herein is preferably performed in the same manner as the recording operation explained above in FIG. 10. Namely, data is preferably divided and recorded, as occasion demands, in accordance with the size of the data to be recorded and the size of the block area.

After that, it is judged whether or not the recording operation is ended (the step S109), and the recording operation is continued, or the recording operation end process is performed (the step S110).

By setting the block area to be variable-length or fixed-length depending on the size of the data to be recorded in this manner, it is possible to record the data, more efficiently. Namely, if data having a relatively small size is recorded into the variable-length block area, it is not efficient because many small size block areas are generated. On the other hand, if data with a relatively large size is recorded into the fixed-length block area, it is not efficient because many divisional data are generated. Thus, in the operation example explained by using FIG. 13, it is possible to prevent such a disadvantage, and it is possible to realize efficient data recording.

(i) First Modified Operation Example

Next, with reference to FIG. 14, a first modified operation example of the information recording/reproducing apparatus 300 in the example will be explained. FIG. 14 is an explanatory diagram conceptually showing the data structure of the optical disc on which data is recorded by the first modified operation example.

In the first modified example, before the ejection operation in the step S204 in FIG. 11, the interlayer buffer area 106 (116) whose size is smaller than the size of the interlayer buffer area generated in the normal operation shown in FIG. 10 and FIG. 12 is generated. For example, if the interlayer buffer area having a length of 0.5 mm, for example, is generated in the normal operation, the interlayer buffer area 106 (116) having a length shorter than 0.5 mm (i.e. a length of 0.1 mm, 0.25 mm or the like) is generated. Then, in this case, the data to be recorded is recorded by providing a predetermined space area so as to generate the interlayer buffer area having a normal length later.

Then, if the ejection operation is performed, an additional interlayer buffer area 110 (120) is generated to make the interlayer buffer area having a normal length (i.e. 0.5 mm or 0.1 mm), as shown in FIG. 14.

As described above, it is only necessary to generate the relatively small interlayer buffer layer in the recording operation, so that it is possible to reduce a time length required for the recording operation. Moreover, the interlayer buffer area having a normal length is generated upon the ejection, so that it is possible to properly prevent the above-mentioned disadvantage of the penetration of the optical pickup.

(ii) Second Modified Operation Example

Next, with reference to FIG. 15, a second modified operation example of the information recording/reproducing apparatus 300 in the example will be explained. FIG. 15 are explanatory diagrams conceptually showing the data structure of the optical disc on which data is recorded by the second modified operation example.

In the second modified operation example, before the ejection operation in the step S204 in FIG. 11, the interlayer buffer area 106 (116) is not generated. Namely, as shown in FIG. 15(a), an area where the interlayer buffer area 106 (116) is to be originally generated (a hatched portion in FIG. 15(a)) does not have "00h" data recorded as describe above, and remains in the unrecorded state. Then, when the ejection operation is performed, the interlayer buffer area 106 (116) is generated, specifically, "00h" data is recorded.

As described above, the interlayer buffer area is not generated in the recording operation, so that it is possible to reduce a time length required for the recording operation. Then, upon the ejection, the interlayer buffer area 106 (116) is generated, as shown in FIG. 15(b), so that it is possible to properly prevent the above-mentioned disadvantage of the penetration of the optical pickup.

(iii) Third Modified Operation Example

Next, with reference to FIG. 16 to FIG. 18, a third modified operation example of the information recording/reproducing apparatus 300 in the example will be explained. FIG. 16 to FIG. 18 are explanatory diagrams conceptually showing the data structure of the optical disc on which data is recorded by the third modified operation example.

In the third modified operation example, as shown in FIG. 16, the last block area C is in the unrecorded state in which data is not recorded. In particular, if the information recording/reproducing apparatus 300 is an information recording/reproducing apparatus capable of recognizing that an optical disc 100e is the optical disc in the example (i.e. the optical disc having a plurality of block areas) and properly recording data into the plurality of block areas, the recording is preferably performed as shown in FIG. 16. In this case, an attribute for functioning as the above-mentioned middle area may be given to the interlayer buffer area 106b (116b) of the block area B located immediately before the block area C. Alternatively, as shown in FIG. 17, the middle area 109 (119) may be newly provided following the block area B located immediately before the block area C.

For example, in the case where the address (e.g. the physical address or the like) of a last sector of the L0 layer is recorded in advance, it is particularly efficient to provide the block area where data is unrecorded, depending on the size of the data to be recorded (i.e. it is particularly efficient not to record the data into the entire data recording area 105), as in the third modified operation example.

Incidentally, as shown in FIG. 18, dummy data, such as "00h", may be recorded into an area where data is unrecorded, if necessary. By virtue of such construction, it is possible to completely provide compatibility with a reproduce-only information reproducing apparatus, so that it is possible to stabilize the operation more, upon data reproduction.

In the above-mentioned examples, the optical disc 100 is explained as one example of the information recording medium, and the recorder or player related to the optical disc 100 is explained as one example of the information recording apparatus. The present invention, however, is not limited to the optical disc and the recorder thereof, and can be applied to other various high-density-recording or high-transmission-rate information recording media, and the recorders or players thereof.

The present invention is not limited to the above-described examples, and various changes may be made, if desired, without departing from the essence or spirit of the invention which can be read from the claims and the entire specification. An information recording medium, an information recording apparatus, an information recording method, and a computer program for recording control, all of which involve such changes, are also intended to be within the technical scope of the present invention.

INDUSTRIAL APPLICABILITY

The information recording medium, the information recording apparatus and method, and the computer program according to the present invention can be applied to an information recording medium, an information recording apparatus, an information recording method, and a computer program or the like, which enable a faster finalize process on the information recording medium having a plurality of recording layers; for example, an information recording medium, such as a DVD, an information recording apparatus, such as a DVD recorder, an information recording method, and a computer program which makes a computer as the information recording apparatus. Moreover, they can be applied to a recording apparatus or the like which is mounted on various computer equipment for consumer use or for business use, or which can be connected to various computer equipment.

The invention claimed is:

1. An information recording apparatus comprising:
   a recording device for recording record information onto an information recording medium comprising: a first recording layer and a second recording layer in each of which the record information can be recorded, wherein the first recording layer includes a lead-in area, a first data area and a first middle area from an inner circumferential side to an outer circumferential side in this order and the second recording layer includes a lead-out area, a second data area and a second middle area from the inner circumferential side to the outer circumferential side in this order; and
   a first controlling device for controlling said recording device (i) to record the record information over the first and the second data areas by a unit of each of a plurality of block areas, each of which includes a first partial recording area of said first recording layer and a second partial recording area of said second recording layer located in a position facing the first partial recording area, in recording area between the lead-in area and the lead-out area, (ii) to set an interlayer buffer area adjacent to an end of the first partial recording area of at least one of the plurality of block areas by recording buffer data for buffering a change operation of changing a recording layer which is a recording target, when the recording layer is changed from said first recording layer to said second recording layer, (iii) to set a second interlayer buffer area adjacent to an end of the second partial recording area of at least one of the plurality of block areas by recording buffer data, when the recording layer is changed from said first recording layer to said second recording layer, (iv) to set a border-in area adjacent to a head of the first partial recording area of at least one of the plurality of block areas by recording management information data for managing the record information which is recorded into the at least one of the plurality of block areas, and (v) to set a border-out area adjacent to a head of the second partial recording area of at least one of the plurality of block areas by recording the management information.

2. The information recording apparatus according to claim 1, further comprising: an ejection judging device for judging whether or not said information recording medium is ejected from said information recording apparatus,
   said first controlling device controlling said recording device to provide the interlayer buffer area if it is judged by said ejection judging device that said information recording medium is ejected.

3. The information recording apparatus according to claim 1, further comprising: an ejection judging device for judging whether or not said information recording medium is ejected from said information recording apparatus,
   said first controlling device controlling said recording device to provide at least one of the plurality of block areas with the interlayer buffer area having a smaller size than a predetermined size of the interlayer buffer area, if the record information is recorded over said first recording layer and said second recording layer,
   said first controlling device controlling said recording device to provide the interlayer buffer area having the predetermined size, by recording the buffer data into an area following the interlayer buffer area having the smaller size, if it is judged by said ejection judging device that said information recording medium is ejected.

4. The information recording apparatus according to claim 1, wherein
   at least one of plurality of block areas is fixed-length,
   said information recording apparatus further comprises a size judging device for judging whether or not a size of the record information to be recorded are larger than a size of the at least one block area, and
   said first controlling device controls said recording device to divide and record the record information to be recorded, if it is judged by said size judging device that the size of the record information to be recorded are larger than the size of the at least one block area.

5. The information recording apparatus according to claim 4, further comprising an ejection judging device for judging whether or not said information recording medium is ejected from said information recording apparatus, and
   said first controlling device controls said recording device, if the record information is not recorded in at least one portion of the at least one fixed-length block area, to record dummy data into the at least one portion of the at least one fixed-length block area.

6. The information recording apparatus according to claim 1, wherein
   at least one of plurality of block areas is variable-length,
   said information recording apparatus further comprises a determining device for determining a size of the at least one variable-length block area, on the basis of a size of the record information to be recorded, and
   said first controlling device controls said recording device to record the record information to be recorded into the at least one variable-length block area having the size determined by said determining device.

7. The information recording apparatus according to claim 1, wherein
   the plurality of block areas include at least one fixed-length block area and at least one variable-length block area,
   said information recording apparatus further comprises a measuring device for measuring a size of the record information to be recorded, and
   said first controlling device controls said recording device to record the record information into the at least one variable-length block area if the size of the record information to be recorded measured by said measuring device is equal to or larger than a predetermined size, and said first controlling device controls said recording device to record the record information into the at least one fixed-length block area if the size measured by said measuring device is smaller than the predetermined size.

8. The information recording apparatus according to claim 1, wherein
   said information recording medium has a pre-record address continuously given in said first recording layer and said second recording layer, the pre-record address determining a position where the record information is recorded on said information recording medium, and
   said information recording apparatus further comprises an address giving device for giving a physical address recorded with the record information onto said information recording medium, so as to be continuous in each of the plurality of block areas.

9. The information recording apparatus according to claim 1, wherein
said information recording medium has a pre-record address continuously given in said first recording layer and said second recording layer, the pre-record address determining a position where the record information is recorded on said information recording medium, and
said information recording apparatus further comprises an address giving device for giving a physical address recorded with the record information onto said information recording medium, so as to be proportional to the pre-record address.

10. The information recording apparatus according to claim 1, wherein
said information recording medium has a pre-record address continuously given in said first recording layer and said second recording layer, the pre-record address determining a position where the record information is recorded on said information recording medium, and
said information recording apparatus further comprises a second controlling device for controlling said recording device, to record discontinuity point information which indicates a discontinuity point of a relationship between a logical address, used when at least one of recording and reproduction of the record information is performed in each of the plurality of block areas, and a physical address recorded with the record information onto said information recording medium, into a management information area to record therein management information for managing the record information, and to record at least one of the record information and reproduction control information for controlling reproduction of the record information such that the logical address is continuous in each of the plurality of block areas.

11. The information recording apparatus according to claim 1, wherein
said information recording medium has a pre-record address continuously given in said first recording layer and said second recording layer, the pre-record address determining a position where the record information is recorded on said information recording medium, and has discontinuity point information recorded in advance, the discontinuity point information indicating a discontinuity point of a relationship between a logical address, used when at least one of recording and reproduction of the record information is performed in each of the plurality of block areas, and a physical address recorded with the record information onto said information recording medium, and
said information recording apparatus further comprises a logical address controlling device for controlling said recording device to record at least one of the record information and reproduction control information for controlling reproduction of the record information by using the logical address having a fixed relationship with the physical address which is proportional to the pre-record address.

12. The information recording apparatus according to claim 1, wherein
said information recording medium has a pre-record address continuously given in each of the plurality of block areas, the pre-record address determining a position where the record information is recorded on said information recording medium, and
said information recording apparatus further comprises a logical address controlling device for controlling said recording device to record at least one of the record information and reproduction control information for controlling reproduction of the record information such that a logical address used when at least one of recording and reproduction of the record information is performed is continuous in each of the plurality of block areas.

13. The information recording apparatus according to claim 1, wherein
said information recording medium has a pre-record address continuously given in each of the plurality of block areas, the pre-record address determining a position where the record information is recorded on said information recording medium, and
said information recording apparatus further comprises a logical address controlling device for controlling said recording device, to record at least one of the record information and reproduction control information for controlling reproduction of the record information such that a logical address used when at least one of recording and reproduction of the record information is performed is proportional to the pre-record address.

14. The information recording apparatus according to claim 8, wherein the pre-record address of said first recording layer and the pre-record address of said second recording layer in a same radial position have a complement number relationship with each other.

* * * * *